United States Patent
Nakagawa

(10) Patent No.: US 9,589,455 B2
(45) Date of Patent: Mar. 7, 2017

(54) VEHICLE REMOTE CONTROL SYSTEM, SERVER, AND REMOTE CONTROL TERMINAL

(75) Inventor: Masashi Nakagawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 14/372,257

(22) PCT Filed: Feb. 22, 2012

(86) PCT No.: PCT/JP2012/054295
§ 371 (c)(1),
(2), (4) Date: Jul. 15, 2014

(87) PCT Pub. No.: WO2013/124990
PCT Pub. Date: Aug. 29, 2013

(65) Prior Publication Data
US 2014/0330453 A1 Nov. 6, 2014

(51) Int. Cl.
*G05D 1/00* (2006.01)
*G08C 17/00* (2006.01)
(Continued)

(52) U.S. Cl.
CPC ......... *G08C 17/00* (2013.01); *B60H 1/00428* (2013.01); *B60H 1/00657* (2013.01);
(Continued)

(58) Field of Classification Search
CPC ............. Y02T 10/7005; Y02T 10/7088; Y02T 90/128; Y02T 90/14; Y02T 90/169; Y02T 90/163; Y02T 90/16
(Continued)

(56) References Cited

U.S. PATENT DOCUMENTS 6,333,602 B1 * 12/2001 Kayser ................... H05B 37/03
315/112
8,527,114 B2 * 9/2013 Ferguson ............... B60K 6/445
701/2
(Continued)

FOREIGN PATENT DOCUMENTS

JP 9 76740 3/1997
JP 11 14126 1/1999
(Continued)

OTHER PUBLICATIONS

International Search Report Issued May 29, 2012 in PCT/JP12/054295 filed Feb. 22, 2012.

*Primary Examiner* — Redhwan k Mawari
(74) *Attorney, Agent, or Firm* — Oblon, McClelland, Maier & Neustadt, L.L.P.

(57) ABSTRACT

After start of pre-air-conditioning, when a preset set condition is satisfied, an in-vehicle terminal transmits information regarding a vehicle state and a screen display command for selection between continuation and termination of the pre-air-conditioning to a mobile terminal. The mobile terminal receives the screen display command and displays a notification indicating the vehicle state and a selection button for selection between the continuation and the termination of the pre-air-conditioning on a screen. After obtaining the vehicle state, the user selects whether to continue or terminate the pre-air-conditioning. In this manner, pre-air-conditioning suitable for each individual user can be performed.

8 Claims, 19 Drawing Sheets

(51) Int. Cl.
    *B60H 1/00* (2006.01)
    *B60L 11/18* (2006.01)
    *B60L 1/00* (2006.01)

(52) U.S. Cl.
    CPC .......... *B60H 1/00735* (2013.01); *B60L 1/003* (2013.01); *B60L 11/184* (2013.01); *B60L 11/1805* (2013.01); *B60L 11/1816* (2013.01); *B60L 11/1824* (2013.01); *B60L 11/1844* (2013.01); *B60L 11/1846* (2013.01); *B60L 11/1848* (2013.01); *B60L 11/1861* (2013.01); *B60L 2210/30* (2013.01); *B60L 2230/16* (2013.01); *B60L 2230/22* (2013.01); *B60L 2240/34* (2013.01); *B60L 2240/622* (2013.01); *B60L 2240/70* (2013.01); *B60L 2240/80* (2013.01); *B60L 2250/12* (2013.01); *B60L 2250/14* (2013.01); *B60L 2250/16* (2013.01); *B60L 2260/52* (2013.01); *B60L 2260/54* (2013.01); *B60L 2260/56* (2013.01); *Y02E 60/721* (2013.01); *Y02T 10/705* (2013.01); *Y02T 10/7005* (2013.01); *Y02T 10/7044* (2013.01); *Y02T 10/7088* (2013.01); *Y02T 10/7241* (2013.01); *Y02T 10/7291* (2013.01); *Y02T 90/121* (2013.01); *Y02T 90/127* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/169* (2013.01); *Y04S 10/126* (2013.01); *Y04S 30/14* (2013.01)

(58) Field of Classification Search
    USPC .......................................... 701/1, 22, 36, 533
    See application file for complete search history.

(56) References Cited

U.S. PATENT DOCUMENTS

| | | | | |
|---|---|---|---|---|
| 2002/0078458 | A1* | 6/2002 | Furon | H04N 1/00132 725/75 |
| 2004/0062963 | A1* | 4/2004 | Umayahara | B60L 11/1881 429/429 |
| 2004/0194479 | A1* | 10/2004 | Umebayashi | B60H 1/00642 62/126 |
| 2006/0090552 | A1* | 5/2006 | Ziegler | G01F 9/008 73/114.54 |
| 2007/0118274 | A1* | 5/2007 | Orebaugh | G07C 5/085 701/117 |
| 2008/0114501 | A1* | 5/2008 | Wu | B60R 25/045 701/2 |
| 2008/0120335 | A1* | 5/2008 | Dolgoff | G05B 23/0216 |
| 2009/0239587 | A1* | 9/2009 | Negron | G06F 3/04883 455/566 |
| 2009/0265048 | A1 | 10/2009 | Ono et al. | |
| 2010/0033372 | A1* | 2/2010 | Pryor | G08G 1/127 342/357.31 |
| 2010/0268411 | A1 | 10/2010 | Taguchi | |
| 2010/0274366 | A1* | 10/2010 | Fata | G05B 15/02 700/7 |
| 2011/0050168 | A1* | 3/2011 | Yoo | B60L 11/1844 320/109 |
| 2011/0101779 | A1* | 5/2011 | Patel | H02J 3/28 307/64 |
| 2011/0166774 | A1* | 7/2011 | Schunder | G01C 21/3469 701/533 |
| 2011/0202181 | A1* | 8/2011 | Lee | F24F 11/0009 700/276 |
| 2011/0278920 | A1* | 11/2011 | Sakamoto | B60L 1/00 307/10.1 |
| 2011/0316547 | A1* | 12/2011 | Liu | G01R 31/362 324/427 |
| 2012/0101659 | A1* | 4/2012 | Kim | B60H 1/00257 701/2 |
| 2012/0112696 | A1* | 5/2012 | Ikeda | B60L 11/1816 320/109 |
| 2012/0131504 | A1* | 5/2012 | Fadell | F24F 11/0086 715/810 |
| 2012/0203379 | A1* | 8/2012 | Sloo | F24F 11/0086 700/276 |
| 2012/0286051 | A1* | 11/2012 | Lyle | G05D 23/1902 236/47 |
| 2012/0309455 | A1* | 12/2012 | Klose | B60L 11/1838 455/557 |
| 2014/0159478 | A1* | 6/2014 | Ang | B60L 1/00 307/9.1 |
| 2014/0188304 | A1* | 7/2014 | Richter | B60L 3/00 701/1 |
| 2014/0330453 | A1* | 11/2014 | Nakagawa | B60H 1/00428 701/2 |

FOREIGN PATENT DOCUMENTS

| | | |
|---|---|---|
| JP | 2006 21659 | 1/2006 |
| JP | 2006 59573 | 3/2006 |
| JP | 2006 290244 | 10/2006 |
| JP | 2010 210271 | 9/2010 |
| JP | 2010 213502 | 9/2010 |
| JP | 2010 241359 | 10/2010 |
| JP | 2010 252449 | 11/2010 |
| WO | 2011 007573 | 1/2011 |

* cited by examiner

VEHICLE REMOTE CONTROL SYSTEM, SERVER, AND REMOTE CONTROL TERMINAL

TECHNICAL FIELD

The present invention relates to a vehicle remote control system for controlling actuation of equipment provided in a vehicle by remote control.

BACKGROUND ART

There is hitherto known a vehicle remote control system for remotely controlling an air conditioner and a battery charger, which are provided in a vehicle. For example, in Patent Literature 1, there is proposed a remote air-conditioning control system for activating a vehicle air conditioner in advance by remote control before riding so as to air-condition a vehicle interior in advance. In the remote air-conditioning control system described above, actuation of the vehicle air conditioner is terminated after elapse of a predetermined air-conditioning time period. At the same time, a mobile terminal is notified of the termination. Moreover, in the remote air-conditioning control system proposed in Patent Literature 1, when a vehicle-interior temperature reaches a set temperature, the mobile terminal is notified that the vehicle-interior temperature has reached the set temperature. Then, the air-conditioning control is continued without any change.

CITATION LIST

Patent Literature

[PTL 1] JP 2006-21659 A

SUMMARY OF INVENTION

Technical Problem

In the hitherto known remote control system described above, however, processing proceeds in accordance with a predetermined routine regardless of the user's intent. Therefore, there are a case where the continuation of actuation of an in-vehicle device (for example, the air-conditioner or the battery charger) is more beneficial for some users and a case where the termination of the in-vehicle device during the actuation thereof is more beneficial for other users. In addition, it is difficult for the user to make a determination to select whether to continue or terminate the actuation of the in-vehicle device. Besides, the user himself/herself is not provided with an incentive to select whether to continue or terminate the actuation of the in-vehicle device. As a result, it is difficult for each individual user to perform suitable remote control.

Solution to Problems

The present invention has been made to cope with the problems described above, and has an object to enable remote control suitable for each individual user.

In order to achieve the above-mentioned object, a feature of one embodiment of the present invention resides in a vehicle remote control system for transmitting a remote control command input by a user to a remote control terminal (300) to an in-vehicle terminal (150) so as to control actuation of an in-vehicle device (180, 130) based on the remote control command, the vehicle remote control system including:

vehicle-state detection means (110a, 110b, 140, 152, 172, S21, S23, S25) for detecting a vehicle state; notification means (S20 to S34) for notifying the user of information regarding the vehicle state by using the remote control terminal when a preset set condition is satisfied after start of the actuation of the in-vehicle device; selection-screen display means (S34) for displaying a selection screen for allowing the user to select whether to continue or terminate the actuation of the in-vehicle device on the remote control terminal when the notification is made by the notification means; and actuation control means (S38) for controlling the actuation of the in-vehicle device in accordance with a result of selection made by the user.

In one embodiment of the present invention, when the user at a position away from the vehicle operates the remote control terminal, the remote control command is transmitted to the in-vehicle terminal. By the remote control command, the actuation of the in-vehicle device is controlled. In this case, the remote control command only needs to be transmitted ultimately to the in-vehicle terminal. Thus, the transmission may be performed through an intermediation of a server or the like. When the preset set condition is satisfied after the start of the actuation of the in-vehicle device, the notification means notifies the user of the information regarding the vehicle state by using the remote control terminal. At the time of notification, the selection-screen display means displays the selection screen for allowing the user to select whether to continue or terminate the actuation of the in-vehicle device on the remote control terminal. In this case, it is preferred to display, for example, the notification of the information regarding the vehicle state on the selection screen.

In this manner, the user is provided with an opportunity to select whether to continue or terminate the actuation of the in-vehicle device. In addition, the user can know the vehicle state. Therefore, the information regarding the vehicle state becomes selection assistance information for the user. As a result, the user can make a selection beneficial for himself/herself. The actuation control means controls the actuation of the in-vehicle device in accordance with the result of selection made by the user. As a result, even when the user is away from the vehicle, the vehicle state can be made desirable for himself/herself. In the present invention, the term "continuation" also means restart after the termination of the actuation.

Another feature of one embodiment of the present invention resides in that: the in-vehicle device is an air-conditioning device (180) for air-conditioning a vehicle interior; and the notification means notifies the user of information regarding a vehicle-interior temperature as the information regarding the vehicle state, by using at least one of a condition that the vehicle-interior temperature reaches a set temperature (S24), a condition that an actuation duration of the air-conditioning device becomes equal to a set time period (S27), or a condition that a current time reaches a set time (S27') as the preset set condition.

One embodiment of the present invention is to be applied to a remote air-conditioning control system. When the vehicle-interior temperature reaches the set temperature, the actuation duration of the air-conditioning device becomes equal to the set time period, or the current time reaches the set time, the user is notified of the information regarding the vehicle-interior temperature. With the notification, the selection screen for allowing the user to select whether to continue or terminate the actuation of the air-conditioning device is displayed. The user can select whether to continue or terminate the actuation of the air-conditioning device based on the vehicle-interior temperature. In this case, it is further preferred that the notification means use both the vehicle-interior temperature reaching the set temperature and the actuation duration of the air-conditioning device becoming equal to the set time period as the notification conditions.

For example, in the air-conditioning device whose air-conditioning is controlled only for a given time period or up to the set time by the remote control command, the vehicle-interior temperature sometimes reaches the set temperature before the termination of actuation of the air-conditioning. In such a case, some users intend to stop air-conditioning at the time when the vehicle-interior temperature reaches the set temperature for energy savings even when the air-conditioning is not performed yet over the predetermined period of time or up to the set time. The vehicle-interior temperature does not sometimes reach the set temperature at the time of termination of actuation of the air-conditioning. In such a case, some users desire to further continue air-conditioning to make the vehicle interior comfortable. According to one embodiment of the present invention, the selection which meets a user's requirement described above can be made.

Another feature of one embodiment of the present invention resides in that: the in-vehicle device is an air-conditioning device for air-conditioning a vehicle interior; and the notification means notifies the user of information regarding a vehicle-interior temperature and a remaining energy amount of an energy supply source for actuation of the air-conditioning device as the information regarding the vehicle state, by using a condition that the remaining energy amount or a travelable distance of a vehicle, which is calculated based on the remaining energy amount, becomes smaller than a set value (S26, S26') as the preset set condition.

One embodiment of the present invention is to be applied to the remote air-conditioning control system. When the remaining energy amount of the energy supply source for actuation of the air-conditioning device becomes lower than the set value or the travelable distance of the vehicle, which is calculated based on the remaining energy amount, becomes smaller than the set value, the user is informed of the information regarding the vehicle-interior temperature and the remaining energy amount. Along with the notification, the selection screen for allowing the user to select whether to continue or terminate the actuation of the air-conditioning device is displayed. Here, the energy supply source for actuation corresponds to, for example, an in-vehicle battery in the case of the air-conditioning device which is actuated by electric power of the in-vehicle battery and a fuel in the case of the air-conditioning device which is actuated by an engine output. The remaining energy amount corresponds to a remaining battery level (electric energy supply capacity) of the in-vehicle battery or a fuel amount.

When the air-conditioning device is actuated, the remaining energy amount of the energy supply source for actuation is lowered. Hence, the distance over which the vehicle can travel with the remaining energy amount becomes shorter. Therefore, in one of embodiment of the present invention, when the remaining energy amount becomes smaller than the set value or the travelable distance of the vehicle, which is calculated based on the remaining energy amount, becomes smaller than the set value, the user is notified of the information regarding the remaining energy amount in addition to the vehicle-interior temperature. Therefore, at the time when the remaining energy amount becomes smaller than the set value as a result of the actuation of the air-conditioning device, the user can make a selection which is beneficial for himself/herself regarding whether to continue or terminate the actuation of the air-conditioning device.

Another feature of one embodiment of the present invention resides in that, in a case where a destination to which the vehicle travels is set in a navigation device (S102), the notification means notifies the user of the information regarding the vehicle-interior temperature and the remaining energy amount as the information regarding the vehicle state, by using an estimation that the vehicle is incapable of traveling to the destination with the remaining energy amount of the energy supply source for actuation (S25, S103 to S105, S107, S26) as the preset set condition.

Under conditions under which the destination is set for the navigation device, energy replenishment (battery charging or refueling) is required in the course of traveling unless the remaining energy amount enough to arrive at the destination is ensured. The energy replenishment in the course of traveling may not be a problem for the user who schedules the energy replenishment in the course of traveling to the destination. However, some users do not intend to continue actuating the air-conditioning device if the energy replenishment is required in the course of traveling. Therefore, in one embodiment of the present invention, the notification means notifies the user of the information regarding the vehicle-interior temperature and the remaining energy amount as the information regarding the vehicle state, by using the estimation that the vehicle cannot travel to the destination with the remaining energy amount of the energy supply source for actuation as the set condition. In this manner, at the time when the remaining energy amount enough to arrive at the destination is still ensured, the user is notified of the information regarding the vehicle-interior temperature and the remaining energy amount. Therefore, the user can appropriately determine whether to continue or terminate the actuation of the air-conditioning device in accordance with a travel plan or an energy replenishment plan. The phrase "estimation that the vehicle cannot travel to the destination" may mean an estimation that the vehicle cannot travel to the destination even with a certain extra amount for the remaining energy amount.

Another feature of one of embodiment of the present invention resides in that: the in-vehicle device is a charging device (130) for charging an in-vehicle battery; and the notification means notifies the user of information regarding a remaining level of the in-vehicle battery and a reason of satisfaction of the preset set condition as the information regarding the vehicle state, by using a condition that a current time becomes out of a lower electricity-rate time period or an estimation that photovoltaic power generation becomes unavailable as the preset set condition (S221, S223).

One embodiment of the present invention is to be applied to a battery charging remote control system. When the current time is out of the lower electricity-rate time period or it is estimated that the photovoltaic power generation becomes unavailable, the user is notified of the information regarding the remaining battery level of the in-vehicle battery and the reason of satisfaction of the set condition. Along with the notification, the selection screen for allowing the user to select whether to continue or terminate the actuation of the charging device is displayed. Here, the lower electricity-rate time period is, for example, a time period to which a lower nighttime electricity rate is applied. Moreover, the phrase "it is estimated that the photovoltaic power generation becomes unavailable" may mean that, for example, the current time is out of a preset sunshine time period, or a photovoltaic power generation amount or a physical quantity relating to the photovoltaic power generation amount becomes lower than a preset reference value.

The user can take the information regarding the remaining battery level of the in-vehicle battery and the reason of satisfaction of the set condition into consideration so as to make a selection regarding whether to continue or terminate the actuation of the charging device, which is beneficial for himself/herself. For example, the user who desires to cut electricity cost required for battery charging can select the termination of battery charging. The user who desires to quickly complete the battery charging can select the continuation of battery charging, giving priority on the charging end time over the electricity cost. Therefore, according to one embodiment of the present invention, the battery charging which meets the user's requirement can be performed. The photovoltaic power generation is generation of photovoltaic power by a photovoltaic power generator connected to an external power supply device for supplying electric power to the in-vehicle battery. The lower electricity-rate time period is a lower electricity-rate time period in a region in which the external power supply device for supplying power to the in-vehicle battery is located.

Another feature of one embodiment of the present invention resides in that: the in-vehicle device is a charging device for charging an in-vehicle battery; and the notification means notifies the user of information regarding a remaining level of the in-vehicle battery and a reason of satisfaction of the preset set condition as the information regarding the vehicle state, by using a condition that the remaining level of the in-vehicle battery is below a set remaining level at end of timer-based charging as the preset set condition (S224).

In the case where the timer-based charging with specification of the charging end time of the in-vehicle battery is performed, the in-vehicle battery is not sometimes charged to the set value (for example, to a full charge level) at the timer-based charging end time. In such a case, some users desire to continue charging the battery. Therefore, in one embodiment of the present invention, when the remaining battery level of the in-vehicle battery is below the set remaining battery level at the end of the timer-based charging, the user is notified of the information regarding the remaining battery level of the in-vehicle battery and the reason of satisfaction of the set condition. Along with the notification, the selection screen for allowing the user to select whether to continue or terminate the actuation of the charging device is displayed. Therefore, even when the timer-based charging is performed, the battery charging which meets the user's requirement can be performed.

Another feature of one embodiment of the present invention resides in that: the vehicle remote control system further includes arrival determination means (S224) for determining whether or not a travel to a destination is possible with the remaining level of the in-vehicle battery at end of the timer-based charging when the destination of the travel of a vehicle is set in a navigation system; and the notification means notifies that the travel to the destination is impossible when the arrival determination means determines that the travel to the destination is impossible.

In one embodiment of the present invention, the arrival determination means determines whether or not the travel to the destination is possible with the remaining battery level of the in-vehicle battery at the end of the timer-based charging. Then, when the arrival determination means determines that the travel to the destination is impossible, the notification means makes a notification indicating the travel to the destination is impossible. Therefore, the user can appropriately determine whether to continue or terminate the actuation of the charging device in accordance with the travel plan or a charging plan. As a result, the user's travel plan can be prevented from going wrong due to insufficient battery charging.

Another feature of one embodiment of the present invention resides in that the vehicle remote control system further includes pre-selection means (G6, G15, 300) for allowing the user to select in advance, for each of a plurality of preset set conditions, whether to continue or terminate the actuation of the in-vehicle device when the each of the plurality of preset set conditions is satisfied.

In one embodiment of the present invention, for the each of the plurality of preset set conditions, the pre-selection means allows the user to select in advance (before the actuation of the in-vehicle device) whether to continue or terminate the actuation of the in-vehicle device when the each of the plurality of preset set conditions is satisfied. The actuation control means uses the result of selection to control the actuation of the in-vehicle device. Therefore, the user can make a selection suitable for himself/herself in advance regarding whether to continue or terminate the actuation of the in-vehicle device. Therefore, the selection operation is not required to be performed during the actuation of the in-vehicle device.

Moreover, one embodiment of the present invention can be applied to a server for mediating communication between the remote control terminal and the in-vehicle terminal in the vehicle remote control system for transmitting the remote control command input by the user to the remote control terminal to the in-vehicle terminal so as to control the actuation of the in-vehicle device based on the remote control command. In this case, a feature of the server according to one embodiment of the present invention resides in that the server includes: condition satisfaction determination means (S20', S30') for receiving the information regarding the vehicle state transmitted from the in-vehicle terminal after start of the actuation of the in-vehicle device to determine based on the information whether or not the preset set condition is satisfied; transmission means (S31', S33) for transmitting to a mobile terminal notification information regarding the vehicle state for a notification to the user and a command for displaying a selection screen for allowing the user to select whether to continue or terminate the actuation of the in-vehicle device when satisfaction of the preset set condition is determined by the condition satisfaction determination means; and selection result transfer means (S37) for receiving a result of selection transmitted from the remote control terminal and transmitting the received result of selection to the in-vehicle terminal.

One embodiment of the present invention can be applied to a remote control terminal in the vehicle remote control system for transmitting the remote control command input by the user to the remote control terminal to the in-vehicle terminal so as to control the actuation of the in-vehicle device based on the remote control command. In this case, a feature of the remote control terminal according to one embodiment of the present invention resides in that the remote control terminal includes: condition satisfaction determination means (S20", S30") for receiving the information regarding the vehicle state transmitted from the in-vehicle terminal after start of the actuation of the in-vehicle device to determine based on the information whether or not the preset set condition is satisfied; notification/selection screen display means (S31", S34) for displaying a selection screen for notifying the user of the information regarding the vehicle state and allowing the user to select whether to continue or terminate the actuation of the in-vehicle device when satisfaction of the preset set condition is determined by the condition satisfaction determination means; and selection result transmission means (S36) for transmitting a result of selection made by the user to the in-vehicle terminal.

Further, another feature of a vehicle remote control system according to one embodiment of the present invention resides in a vehicle remote control system for transmitting a remote control command input by a user to a remote control terminal (300) to an in-vehicle terminal (150) so as to control actuation of an in-vehicle device (180, 130) based on the remote control command, the vehicle remote control system including: selection-screen display means (300, G15) for displaying a selection screen for allowing the user to select in advance whether to continue or terminate the actuation of the in-vehicle device when a preset set condition is satisfied; and actuation control means (S20, S30, S38) for storing a result of selection regarding whether to continue or terminate the actuation of the in-vehicle device and for controlling the actuation of the in-vehicle device in accordance with the result of selection during the actuation of the in-vehicle device.

In one embodiment of the present invention, the selection-screen display means displays the selection screen for allowing the user to select in advance whether to continue or terminate the actuation of the in-vehicle device when the preset set condition is satisfied. The actuation control means stores the result of selection made by the user and controls the actuation of the in-vehicle device in accordance with the result of selection during the actuation of the in-vehicle device. Therefore, the user can make a selection in advance whether to continue or terminate the actuation of the in-vehicle device, and therefore is not required to perform the selection operation during the actuation of the in-vehicle device. Moreover, the user can make a selection beneficial for himself/herself. Thus, even when the user is away from the vehicle during the actuation of the in-vehicle device, the vehicle state can be made appropriate for himself/herself.

In the description given above, for easy understanding of the present invention, the reference symbols used in an embodiment of the present invention are provided in parentheses for configurations of the invention corresponding to the embodiment. However, each constituent element of the present invention is not limited to the embodiment defined by the reference symbols.

DESCRIPTION OF EMBODIMENT

Figure 1:
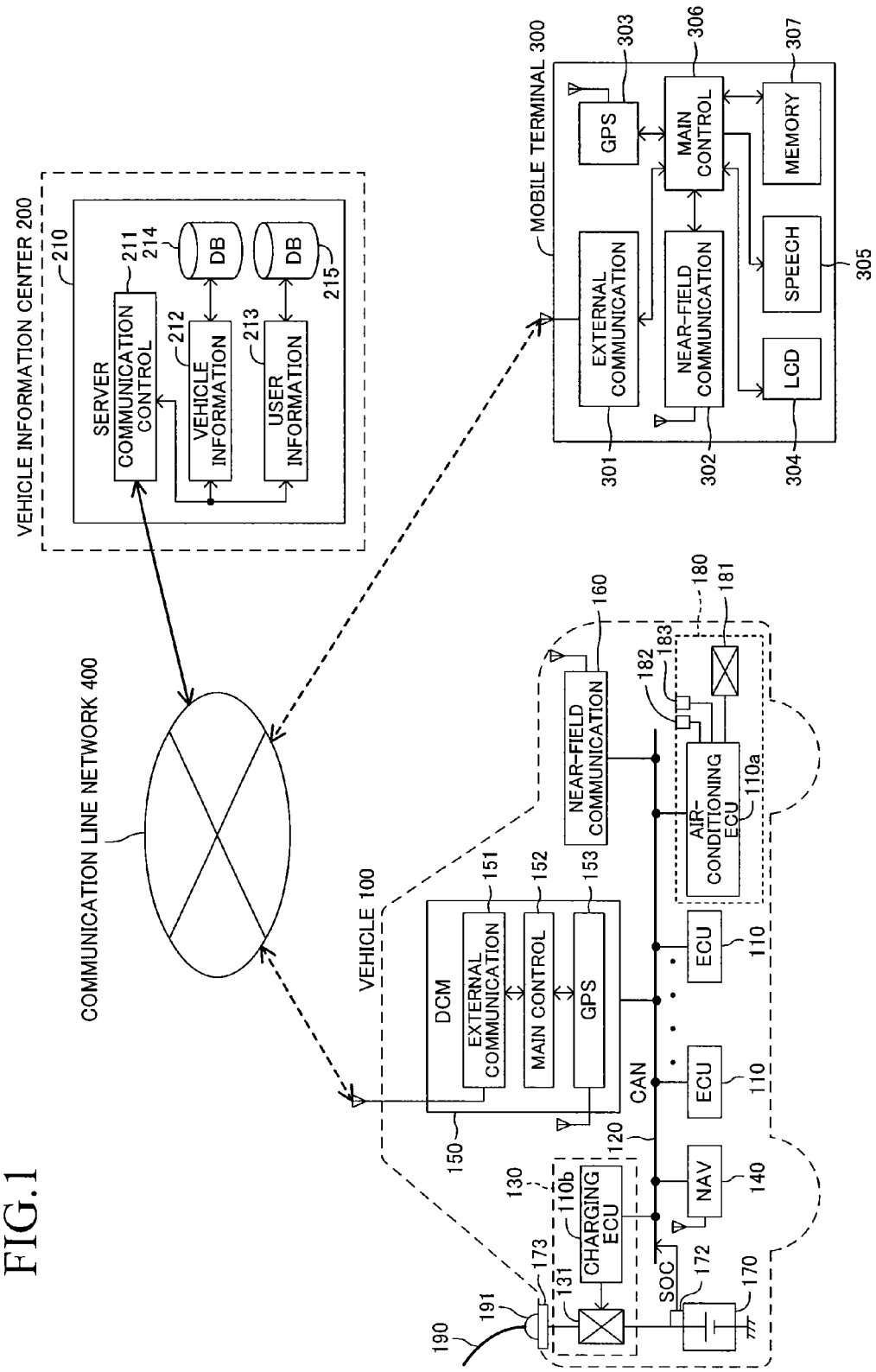
FIG. 1 is a schematic configuration diagram of an information communication system for a vehicle, to which a vehicle remote control system according to an embodiment of the present invention is applied.

Now, a vehicle remote control system according to an embodiment of the present invention is described referring to the drawings. FIG. 1 illustrates an information communication system for a vehicle. The vehicle remote control system of this embodiment is to be applied to the information communication system.

First, the information communication system for a vehicle is described. The information communication system for a vehicle organically connects a vehicle 100, a vehicle information center 200, and a mobile terminal 300 owned by a vehicle user (hereinafter referred to simply as "user") by using a communication line network 400 such as the Internet to provide the user with various types of service. The vehicle 100 includes a plurality of electronic control devices 110 (hereinafter referred to as "vehicle ECUs 110") for controlling a state of the vehicle. Each of the vehicle ECUs 110 is connected to a controller area network (CAN) communication line 120 of a CAN communication system, and can transmit and receive various types of signals through the CAN communication line 120. Each of the vehicle ECUs 110 includes a microcomputer, a memory, an input/output interface, a drive circuit for driving various types of actuators by input of sensor signals thereto, and the like.

As one of the plurality of vehicle ECUs 110 connected to the CAN communication line 120, an air-conditioning control device 110a (hereinafter referred to as "air-conditioning ECU 110a") serving as a control section for an air-conditioning device 180 (automatic air-conditioner) is provided. The air-conditioning device 180 includes the air-conditioning ECU 110a including a microcomputer as a principal part to control air conditioning, an output equipment group 181 including a compressor, a fan, and an air-outlet switching damper, and sensors such as a vehicle-interior temperature sensor 182 for detecting a temperature of a vehicle interior and an outside-air temperature sensor 183 for detecting a temperature of an outside air. The vehicle-interior temperature sensor 183 is provided to, for example, inside an instrument panel of the vehicle 100. The outside-air temperature sensor 183 is provided to, for example, a front bumper of the vehicle 100. The air-conditioning ECU 110a controls actuation of the output equipment group 181 based on detection values detected by the sensors such as the vehicle-interior temperature sensor 182 and the outside-air temperature sensor 183 and a set value set by an occupant to air-condition the vehicle interior.

Further, as one of the plurality of vehicle ECUs 110 connected to the CAN communication line 120, a charging control device 110b (hereinafter referred to as "charging ECU 110b") serving as a control section for a battery charging device 130 is provided. The battery charging device 130 includes the charging ECU 110b including a microcomputer as a principal part to control charging of a battery 170, and a charger 131 provided in a charging path from a power inlet 173 to the battery 170. By connecting a connecting plug 191 for a charging cable 190 to the power inlet 173 to actuate the charger 131, the battery 170 is supplied with charging electric power from a household outlet or a power-feeding device (not shown) so as to be charged.

The battery 170 is provided with a state of charge (SOC) detector 172 for detecting an SOC, which is a value indicating a charged state of the battery 170. The SOC detector 172 transmits a signal indicating a remaining level of the battery 170 to the CAN communication line 120 as the SOC in predetermined cycles. At the time of charging of the battery 170, the charging ECU 110b actuates the charger 131 to charge the battery 170 until the remaining battery level detected by the SOC detector 172 reaches a target value (for example, a full charge level) set by the user. When timer-based charging is set, the charging ECU 110b charges the battery in accordance with the timer-based setting. In particular, when a charging end time is set, the charging of the battery is terminated at the charging end time regardless of the remaining battery level. The remaining battery level is an index of an electric energy amount which can be output by the battery 170, and may be a charging capacity or a charging rate. In this embodiment, a charging rate in % is used as the remaining battery level.

When the air-conditioning ECU 110a, the charging ECU 110b, and the other vehicle ECUs 110 are not to be distinguished from each other, the above-mentioned ECUs are hereinafter collectively referred to simply as "vehicle ECUs 110".

Further, a data communication module 150 (hereinafter referred to as "DCM 150"), which is an in-vehicle terminal to be connected to the communication line network 400 for intercommunication to/from the vehicle information center 200, is connected to the CAN communication line 120. The DCM 150 includes an external communication control section 151 for data communication to/from a server 210 of the vehicle information center 200 through the communication line network 400, a main control section 152 for acquiring control information by data communication to/from the vehicle ECUs 110 or the like through the CAN communication line 120 and for outputting a command to the ECUs 110 or the like, and a GPS unit 153 for detecting coordinates of a current position of the self-vehicle based on a radio wave from a GPS satellite. The DCM 150 includes a microcomputer as a principal part, and also includes a memory, a wireless communication circuit, an input/output interface, and the like.

A near-field communication control device 160 as a communication interface for near-field wireless communication to/from the mobile terminal 300 is also connected to the CAN communication line 120. Although the Bluetooth is used as a communication method of the near-field communication control device 160 in this embodiment, other near-field wireless communication methods such as Wi-Fi may be adopted. Moreover, a navigation device 140 for guiding the vehicle 100 to a destination is connected to the CAN communication line 120. The navigation device 140 includes a vehicle-position detecting unit for detecting the position or a traveling direction of the vehicle, a memory for storing various types of information such as map data, a microcomputer for executing an application for guiding the travel of the vehicle to the destination, a touch-panel type liquid crystal display, a voice navigation system, and the like (configurations thereof are not shown).

The vehicle information center 200 is a center which uses vehicle information transmitted from the vehicle 100 and information acquired from Web sites or the like to provide the user with various types of service information. The vehicle information center 200 includes the server 210 including a microcomputer as a principal part. When classified based on functions, the server 210 includes a communication control section 211 to be connected to the communication line network 400 to control communication, a vehicle information server 212 for managing the vehicle information, a user information server 213 for managing user information of the vehicle, a vehicle information storage section 214 for storing a database of the vehicle information, and a user information storage section 215 for storing a database of the user information. The server 210 stores association information for associating an ID for identifying the vehicle 100 (information corresponding to a registration number or a vehicle number) and an ID for identifying the user (such as a user name, a telephone number of the mobile terminal 300, or an e-mail address) with each other, and is configured to be able to extract the information identified by any one of the IDs by specifying another of the IDs. The vehicle information server 212 has not only a function of managing various types of information but also has a function of remotely controlling the vehicle 100.

As the mobile terminal 300 owned by the user, for example, a smartphone or a cellar phone is used. The mobile terminal 300 includes an external communication control section 301 which is a communication interface for connection to the communication line network 400, a near-field communication control section 302 which is a communication interface for near-field wireless communication using the Bluetooth, a GPS unit 303 for detecting coordinates of a current position of the mobile terminal 300 based on the radio wave from the GPS satellite, a touch-panel type liquid crystal display 304 serving as both a display and an operation device, a speech section 305 including a speaker and an amplifier for audio notification, a main control section 306 including a microcomputer responsible for communication control and the execution of various applications, and a non-volatile memory 307 for storing application programs and various types of data. Besides a telephone function, an e-mail function, a function of connecting to the Internet, and a function of executing various application programs, the mobile terminal 300 also has a function of connecting to the server 210 of the vehicle information center 200 so as to transmit and receive various types of information and commands.

The vehicle 100 of this embodiment is a plug-in electric vehicle whose battery is chargeable by an external power supply, such as an electric vehicle (EV) for driving a drive motor with electric power of a battery and a plug-in hybrid vehicle including a drive motor and an internal combustion engine, which has an externally chargeable battery serving as a power supply for the drive motor. However, a vehicle applicable to the information communication system may also be a conventional vehicle without the drive motor, which travels by the internal combustion engine, and any drive method may be used.

In the information communication system for a vehicle described above, the DCM 150 transmits various types of information regarding the vehicle 100 together with the vehicle ID (information corresponding to the registration number or the vehicle number) to the server 210 of the vehicle information center 200. Then, the server 210 transmits information necessary for the user to the mobile terminal 300. For example, the DCM 150 acquires information indicating the remaining battery level from the CAN communication line 120, and regularly transmits the acquired information together with the vehicle ID and the vehicle-position information to the server 210 of the vehicle information center 200. In this manner, the server 210 of the vehicle information center 200 can obtain the charged state of the battery 170 of the vehicle 100 together with the vehicle position. When the remaining battery level is decreasing, an available charging station within a cruising distance for the vehicle 100 is searched for by using a Web site or the like. A charging reminder massage is transmitted to the mobile terminal 300 of the user, whereas the results of search (such as a list of charging stations) are transmitted to the mobile terminal 300 of the user.

Moreover, setting a time period from turning-ON to turning-OFF of an ignition switch (or an accessory switch) as one interval (referred to as "one trip interval"), the DCM 150 transmits drive information such as a travel distance, traveling time, and consumed electric power during one trip interval together with the vehicle ID and the vehicle-position information to the server 210. The server 210 stores the received drive information and vehicle-position information in association with the vehicle ID in the vehicle-information storage section 214. In this manner, the user can start an application of the mobile terminal 300 as needed to obtain necessary information from the server 210. For example, when the user starts the application installed on the mobile terminal 300 to make a request for information regarding electric efficiency/fuel efficiency and the like to the server 210, the server 210 generates information in accordance with the request of the user based on the drive information stored in the vehicle-information storage section 214 and transmits the generated information to the mobile terminal 300.

Moreover, in the information communication system for a vehicle, by transmitting an operation command input to the mobile terminal 300 of the user to the server 210 of the vehicle information center 200, the air-conditioning device 180 and the battery charging device 130, which are in-vehicle devices, can be remotely controlled via the server 210. When the air-conditioning device 180 is to be remotely controlled, the user can start the air-conditioning device 180 in advance before riding so as to air-condition the vehicle interior. The air-conditioning described above is called "pre-air-conditioning".

A flow of information in the mobile terminal 300, the server 210, and the DCM 150 when the in-vehicle device is remotely controlled is now described. The case where the pre-air-conditioning is performed is described herein. However, the flow of information is basically the same even in the case where the battery is charged by the remote control.

Figure 2:
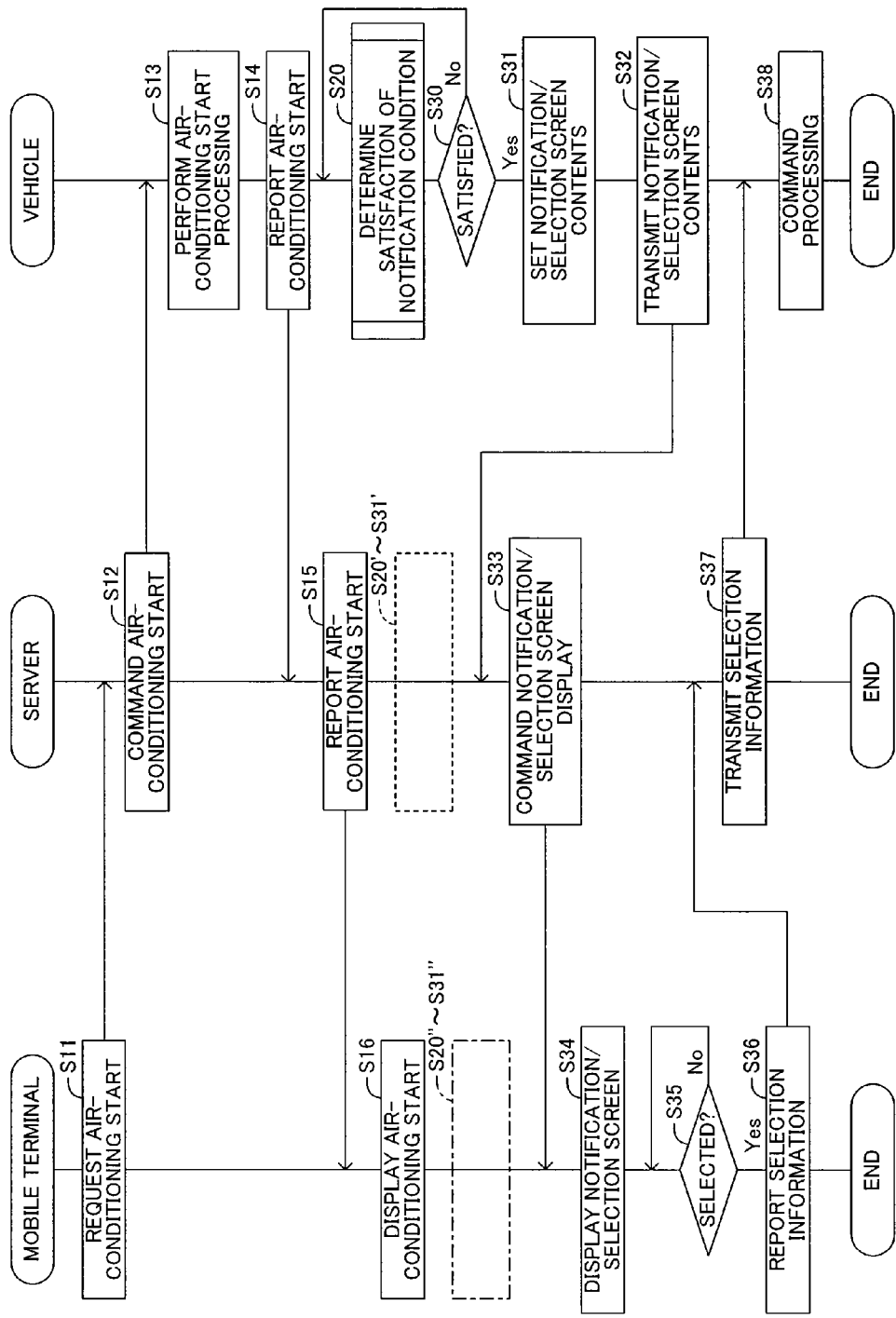
FIG. 2 is a flowchart illustrating a remote control routine.

In the following, a flow of a communication command for the pre-air-conditioning is described. FIG. 2 is a flowchart illustrating a remote control routine for pre-air-conditioning. The pre-air-conditioning is performed by the cooperation between the mobile terminal 300, the server 210, the DCM 150, the ECUs 110, and the navigation device 140.

First, the user operates the mobile terminal 300 to launch a pre-air-conditioning application so as to start the pre-air-conditioning. The pre-air-conditioning application is stored in advance in the non-volatile memory 307 of the mobile terminal 300. In the following description, the main control section 306 of the mobile terminal 300, which executes the pre-air-conditioning application program, is referred to simply as "mobile terminal 300".

When the pre-air-conditioning application is started, a pre-air-conditioning screen is displayed on the touch-panel type liquid crystal display 304. The user touches and operates a start button displayed on the pre-air-conditioning screen. In this manner, in Step S11, the mobile terminal 300 transmits a pre-air-conditioning start request to the server 210 of the vehicle information center 200. When performing the communication to/from the server 210, the mobile terminal 300 always transmits a mobile-terminal ID together. In Step S12, when receiving the pre-air-conditioning start request transmitted from the mobile terminal 300, the server 210 transmits a pre-air-conditioning start command to the DCM 150 of the vehicle 100 corresponding to the ID of the mobile terminal 300 (hereinafter referred to simply as "DCM 150").

When receiving the start command transmitted from the server 210, the DCM 150 starts the CAN communication system and the vehicle ECUs 110, and in addition, transmits an air-conditioning start command to the air-conditioning ECU 110*a* in Step S13. After performing pre-air-conditioning start processing in accordance with the air-conditioning start command, the air-conditioning ECU 110*a* transmits a start completion report to the DCM 150. In Step S14, based on the start completion report, the DCM 150 transmits a pre-air-conditioning start report to the server 210. Then, in Step S15, the server 210 transmits the pre-air-conditioning start report to the mobile terminal 300. In Step S16, when receiving the pre-air-conditioning start report, the mobile terminal 300 performs display indicating that the pre-air-conditioning has been started on a display screen of the touch-panel type liquid crystal display 304.

In this embodiment, when receiving the pre-air-conditioning start command, the air-conditioning ECU 110*a* actuates the air-conditioning device 180 only for a preset actuation set time period to (for example, ten minutes). The air-conditioning device 180 is configured so that the actuation thereof is forcibly stopped when the remaining battery level is lowered to a preset forced-stop remaining level (for example, 30%).

Figure 3:
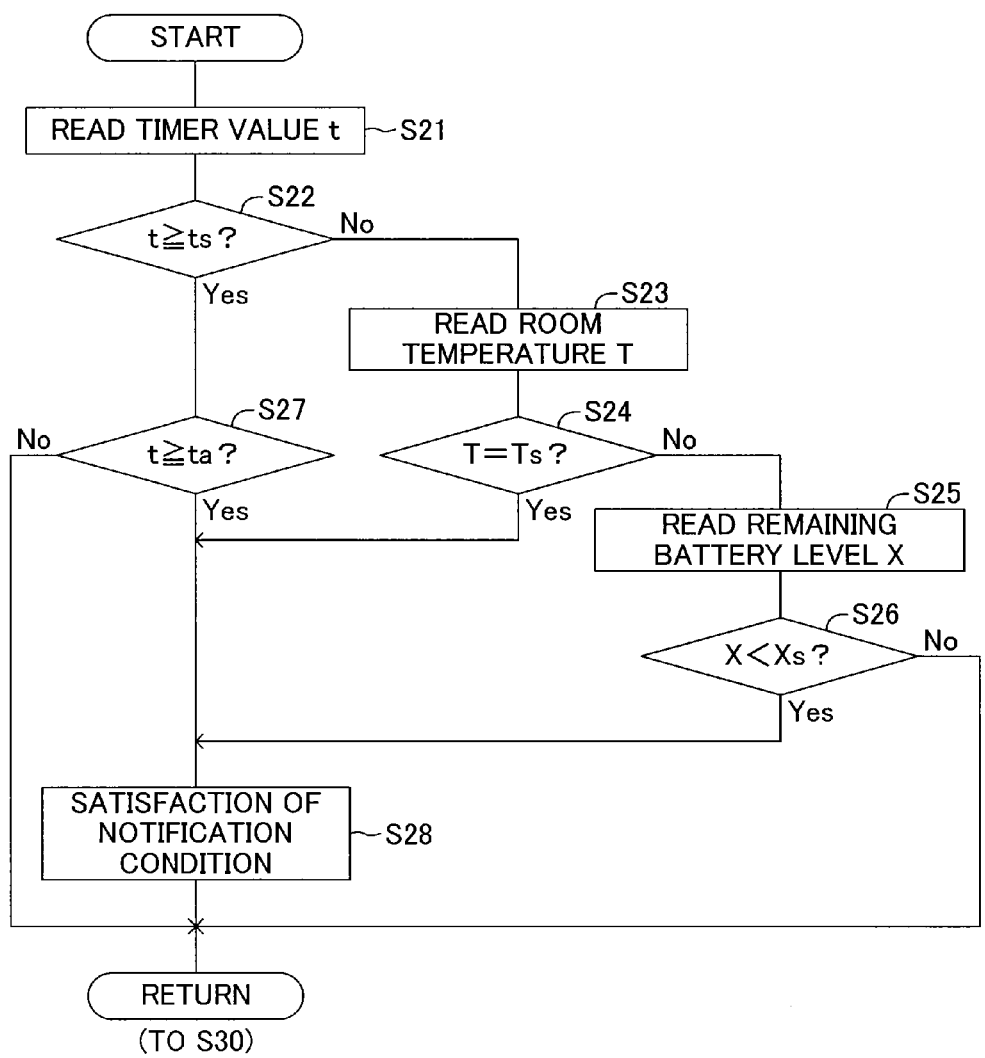
FIG. 3 is a flowchart illustrating a notification-condition satisfaction determination routine.

After transmitting the pre-air-conditioning start report to the server 210 (S14), the DCM 150 performs notification-condition satisfaction determination processing in subsequent Step S20. FIG. 3 is a flowchart illustrating a notification-condition satisfaction determination routine corresponding to the processing in Step S20. As for the notification-condition satisfaction determination routine, processing for pre-air-conditioning and processing for battery charging are different from each other. Therefore, the notification-condition satisfaction determination routine for battery charging is described later.

After the notification-condition satisfaction determination routine is started, the DCM 150 reads a timer value t in Step S21. The timer value t is a count value of a timer for starting counting time when the pre-air-conditioning is started, that is, indicates elapsed time from the start of the pre-air-conditioning. Subsequently, in Step S22, the DCM 150 determines whether or not the time value t is equal to or larger than a predetermined determination set time period ts. At the start of the pre-air-conditioning, the timer value t is a small value. Therefore, the DCM 150 determines "No", and the processing proceeds to Step S23. In this embodiment, when the actuation set time period ta elapses from the start of the pre-air-conditioning, the air-conditioning ECU 110a stops the actuation. The determination set time period ts is set to a time period which is a predetermined time period (for example, one minute) shorter than the actuation set time period ta in which the air-conditioning ECU 110a performs the pre-air-conditioning.

In Step S23, the DCM 150 reads a current vehicle-interior temperature T (detected temperature) and a set temperature Ts (target temperature) preset by the user from the air-conditioning ECU 110a, and in Step S24, determines whether or not the vehicle-interior temperature T has become equal to the set temperature Ts. The determination may be performed in the air-conditioning ECU 110a so that the DCM 150 reads the result of determination.

In the case where the vehicle-interior temperature T has not reached the set temperature Ts, the processing by the DCM 150 proceeds to Step S25. In Step S25, the DCM 150 reads a remaining level X of the battery 170 (hereinafter referred to as "remaining battery level X") through the CAN communication line 120. In subsequent Step S26, the DCM 150 determines whether or not the remaining battery level X is lower than a set remaining level Xs. The set remaining level Xs is described later.

When determining "No", that is, determining that the remaining battery level X is equal to or higher than the set value Xs in Step S26, the DCM 150 temporarily exits the notification-condition satisfaction determination routine without satisfaction of the notification condition, and in subsequent Step S30, determines whether or not the notification condition is satisfied. In this case, the notification condition is not satisfied yet. Therefore, the DCM 150 executes the notification-condition satisfaction determination routine (S20) again.

The DCM 150 repeats the processing in Steps S20 to S30. After the pre-air-conditioning is started, the timer value t increases, and the vehicle-interior temperature T approaches the set temperature Ts. Moreover, the air-conditioning device 180 is actuated using the battery 170 as a power supply. Thus, after the pre-air-conditioning is started, the remaining battery level X becomes lower. When the vehicle-interior temperature T reaches the set temperature Ts (S24: Yes) or the remaining battery level X becomes lower than the set remaining level Xs (S26: Yes) before the timer value t reaches the determination set time period ts (S22: No), the DCM 150 determines in Step S28 that the notification condition is satisfied. In this case, the notification condition is satisfied during the actuation of the pre-air-conditioning.

On the other hand, when the timer value t reaches the determination set time period ts (S22: Yes) before the vehicle-interior temperature T reaches the set temperature Ts (S24: No) and the remaining battery level X becomes lower than the set remaining level Xs (S26: No), the DCM 150 waits until elapse of the actuation set time period ta at the end of which the pre-air-conditioning is terminated in Step S27 and then determines in Step S28 that the notification condition is satisfied.

When the notification condition is satisfied as a result of the termination of actuation of the air-conditioning (S27: Yes), the DCM 150 reads the vehicle-interior temperature T at the end of the actuation set time period ta, and distinguishes the case where the vehicle-interior temperature has not reached the set temperature Ts and the case where the vehicle-interior temperature has reached the set temperature Ts from each other. Then, in the case where the vehicle-interior temperature T has reached the set temperature Ts, a selection regarding whether to continue or terminate the pre-air-conditioning is excluded from targets to be displayed for selection in processing described later.

When the notification condition is satisfied, "Yes" is determined in Step S30. Then, the processing by the DCM 150 proceeds to Step S31.

In this embodiment, the main control section 152 of the DCM 150 executes the notification-condition satisfaction determination routine. However, the air-conditioning ECU 110a may execute the notification-condition satisfaction determination routine and transmit the result of satisfaction of the notification condition to the DCM 150. Alternatively, the determination processing may be distributed to other ECUs 110.

The set remaining level Xs to be compared with the remaining battery level X in Step S26 is described. In the vehicle 100 of this embodiment, the battery 170 is used as a power supply for driving. Therefore, when the remaining level in the battery 170 is lowered by the pre-air-conditioning, the cruising distance becomes shorter for the vehicle 100 with the lowered remaining level. In this case, under conditions under which a destination is set in the navigation device 140, the battery is required to be charged in the course of traveling unless the remaining battery level which is high enough to arrive at the destination is ensured. The battery charging may not become a problem for a user who plans battery charging in the course of traveling to the destination. However, some users do not prefer to continue the pre-air-conditioning if the battery is required to be charged in the course of traveling. Therefore, the set remaining level Xs is set to a value which enables the arrival at the destination as described below.

Figure 4:
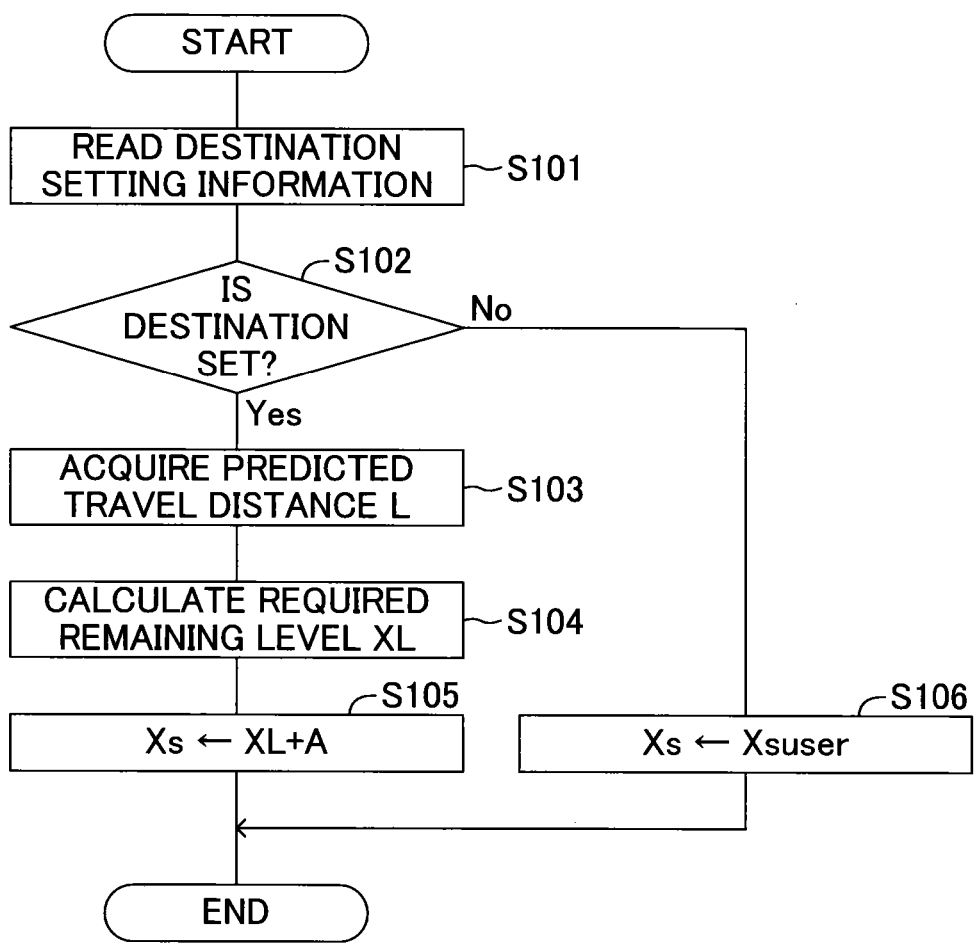
FIG. 4 is a flowchart illustrating a set remaining-level setting routine.

FIG. 4 illustrates a set remaining-level setting routine executed by the DCM 150 (main control section 152). The set remaining-level setting routine is executed immediately before the execution of the notification-condition satisfaction determination routine. After the set remaining level setting routine is started, in Step S101, the DCM 150 reads destination setting information from the navigation device 140. The destination setting information is information indicating whether or not the destination for navigation is set.

Subsequently, in Step S102, the DCM 150 determines based on the destination setting information whether or not the destination for navigation is set. When the destination is set, in Step S103, information indicating a predicted travel distance L which is a length of a traveling path from a self-vehicle position to the destination is read from the navigation device 140. Subsequently, in Step S104, a remaining battery level XL required for the travel over the predicted travel distance L (referred to as "required remaining level XL") is calculated. The DCM 150 stores electric-efficiency characteristics of the self-vehicle. For example, a travelable distance for each remaining battery level, or a battery capacity required per unit travel distance is stored. Therefore, the required remaining level XL can be calculated based on the predicted travel distance L. The electric-efficiency characteristics of the self-vehicle may be acquired from the server 210 of the vehicle information center 200 each time. Alternatively, the server 210 may calculate the required remaining level XL so that the DCM 150 acquires the result of calculation.

Subsequently, in Step S105, the DCM 105 calculates a value obtained by adding an extra amount A to the required remaining level XL, and sets the result of calculation as the set remaining level Xs (Xs=XL+A). The extra amount A is a capacity which is set so that a certain amount of battery capacity remains even after the vehicle arrives at the destination, and may be set arbitrarily. For example, the user may be able to set the extra amount A in advance by using the mobile terminal 300. In this case, the extra amount A is transmitted to the DCM 150 so as to be stored therein. Then, the DCM 150 uses the extra amount A set by the user to calculate the set remaining level Xs. When the calculated set remaining level Xs is smaller than a preset minimum value Xmin, the minimum value Xmin is used as the set remaining level Xs (Xs←Xmin). The minimum value Xmin is set to a value larger than the forced-stop remaining level at which the actuation of the air-conditioning device 180 is to be forcibly stopped.

On the other hand, when it is determined that the destination for navigation is not set (S102: No), in Step S106, the DCM 150 sets a set value $Xs_{user}$ which is preset by the user as the set remaining level Xs. The set value $Xs_{user}$ is also set to a value larger than the forced-stop remaining level at which the actuation of the air-conditioning device 180 is to be forcibly stopped. The set value $Xs_{user}$ is set by, for example, an operation of the mobile terminal 300 by the user, and is transmitted to the DCM 105 so as to be stored therein. The set value $Xs_{user}$ is indicated by using, for example, the battery charging rate (for example, 50%). The set remaining level Xs to be set in Step S106 is not required to be set equal to the set value $Xs_{user}$ which is set by the user, but may be a preset fixed value.

After setting the set remaining level Xs in Step S105 or S106, the DCM 150 terminates the set remaining-level setting routine. The set remaining level Xs is used as a criterion for determination in Step S26 of the notification-condition satisfaction determination routine. Therefore, when the destination for navigation is set and "Yes" is determined in Step S26, the vehicle is under conditions under which it is estimated that the vehicle cannot arrive at the destination with the remaining battery level X at the point of time. The phrase "it is estimated that the vehicle cannot arrive at the destination" means that it is estimated that the vehicle cannot arrive at the destination even with a certain extra amount for the remaining battery level.

Returning to the description of the remote control routine for pre-air-conditioning illustrated in FIG. 2, when the notification condition is satisfied (S30: Yes), in Step S31, the DCM 150 (main control section 152) performs notification/selection screen content setting processing in accordance with a reason of satisfaction of the notification condition. In the remote control system for air-conditioning of this embodiment, when the notification condition is satisfied, the selection display for allowing the user to select whether to continue or terminate the pre-air-conditioning by using the mobile terminal 300 is performed as described later. In this case, the information regarding the vehicle state (such as the vehicle-interior temperature and the remaining battery level) and the reason of satisfaction of the notification condition are simultaneously notified so as to assist the selection and determination by the user. For the notification, in Step S31, the DCM 150 sets contents (such as a guidance notification, a state notification, and a selection button, which are described later) necessary for the screen display on the mobile terminal 300 in Step S31. In this case, the DCM 150 acquires information necessary for the state notification from the air-conditioning ECU 110a, the charging ECU 110b, and the navigation device 140. The contents of the notification/selection screen, which are set in Step S31, are described in the description of the notification/selection screen on the mobile terminal 300 described later, and therefore the description thereof is herein omitted.

After the completion of the notification/selection screen content setting processing, in Step S32, the DCM 150 transmits notification/selection screen content information indicating the notification/selection screen contents to the server 210. When receiving the notification/selection screen content information, in Step S33, the server 210 transmits a notification/selection screen display command containing the notification/selection screen content information to the mobile terminal 300. When receiving the notification/selection screen display command, in Step S34, the mobile terminal 300 displays the notification/selection screen on the display 304 based on the notification/selection screen content information.

The notification/selection screen is set so as to be different in accordance with the reason of satisfaction of the notification condition. When the notification condition is satisfied because the vehicle-interior temperature reaches the set temperature during the air-conditioning (S24: Yes), the mobile terminal 300 displays a notification/selection screen G1 illustrated in FIG. 5. On the notification/selection screen G1, a guidance notification M1 "ROOM TEMPERATURE HAS REACHED SET TEMPERATURE. YOU CAN STOP REMOTE AIR-CONDITIONING FOR ELECTRICITY SAVINGS." is displayed. Below the guidance notification M1, a state notification M2 regarding the vehicle state, which indicates the set temperature, the vehicle-interior temperature, and the remaining battery level (charging rate), is displayed. The state notification M2 is displayed as, for example, "SET TEMPERATURE: 25° C., ROOM TEMPERATURE: 25° C., REMAINING BATTERY LEVEL: 80%". The numerical values described here are merely examples. Below the state notification M2, a stop selection button B1 with an indication "STOP" for commanding the termination of the air-conditioning and a continuation selection button B2 with an indication "CONTINUE" for commanding the continuation of the air-conditioning are displayed.

When the notification condition is satisfied because the remaining battery level becomes lower than the set remaining level during the air-conditioning (S26: Yes) and the destination is not set in the navigation device 140 (S102: No), the mobile terminal 300 displays a notification/selection screen G2 illustrated in FIG. 6. On the notification/selection screen G2, the guidance notification M1 "REMAINING BATTERY LEVEL IS DECREASING. YOU CAN STOP REMOTE AIR-CONDITIONING FOR ELECTRICITY SAVINGS." is displayed. Below the guidance notification M1, the state notification M2 regarding the vehicle state, which indicates the set temperature, the vehicle-interior temperature, and the remaining battery level, is displayed. Below the state notification M2, the stop selection button B1 for commanding the termination of the air-conditioning and the continuation selection button B2 for commanding the continuation of the air-conditioning are displayed.

When the notification condition is satisfied because the remaining battery level becomes lower than the set remaining level during the air-conditioning (S26: Yes) and the destination is set in the navigation device 140 (S102: Yes), the mobile terminal 300 displays a notification/selection screen G3 illustrated in FIG. 7. On the notification/selection screen G3, the guidance notification M1 "REMAINING BATTERY LEVEL IS DECREASING. YOU CAN STOP REMOTE AIR-CONDITIONING TO SAVE ELECTRIC- ITY FOR TRAVEL TO DESTINATION." is displayed. Below the guidance notification M1, the state notification M2 indicating both the information regarding the vehicle state indicating the set temperature, the vehicle-interior temperature, and the remaining battery level, and information regarding travel assistance indicating the destination, the distance to the destination, and the remaining battery level (charging rate) necessary for the travel to the destination is displayed. The information notification regarding the travel assistance is displayed as, for example, "DESTINATION: ***, DISTANCE TO DESTINATION: 40 km, REMAINING BATTERY LEVEL NECESSARY FOR TRAVEL: 45%". As the information regarding the travel assistance, the values which are calculated at the time of execution of the set remaining level setting routine (FIG. 4) are used. Below the state notification M2, the stop selection button B1 for commanding the termination of the air-conditioning, the continuation selection button B2 for commanding the continuation of the air-conditioning, an air-conditioning stop and charging start button B3 for commanding the termination of the air-conditioning and the start of battery charging with an indication "STOP AIR-CONDITIONING AND START CHARGING", and an air-conditioning continuation and charging start button B4 for commanding the continuation of the air-conditioning and the start of battery charging with an indication "CONTINUE AIR-CONDITIONING AND START CHARGING" are displayed.

Figure 8:
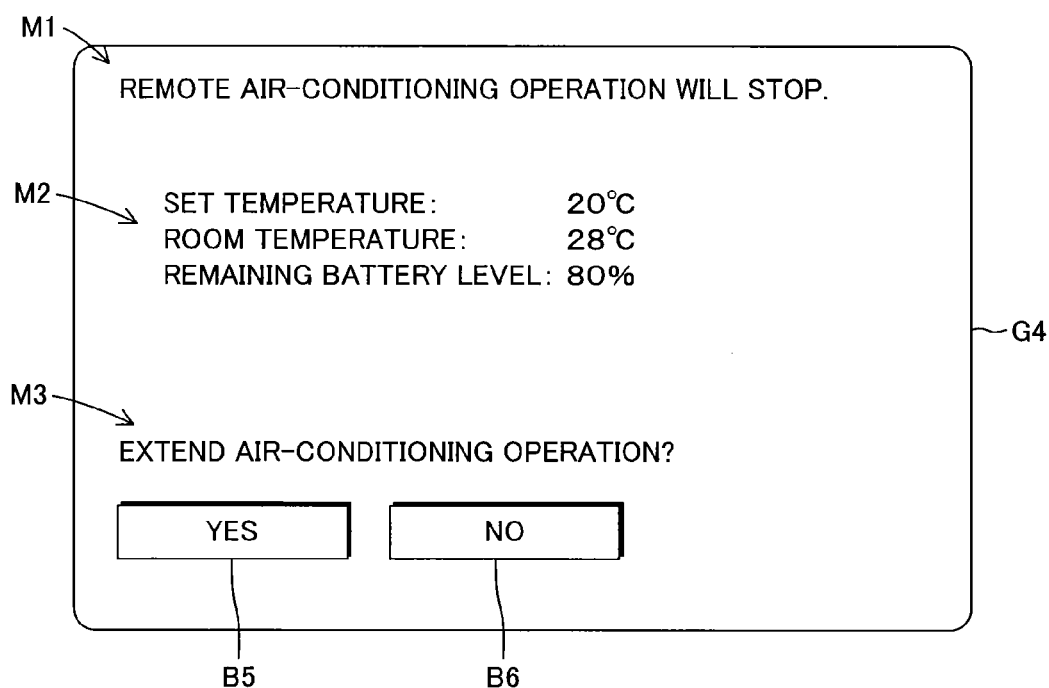
FIG. 8 illustrates a further display screen of the mobile terminal.

When the notification condition is satisfied in synchronization with the termination of actuation of the pre-air-conditioning (S27: Yes) and the vehicle-interior temperature does not reach the set temperature at the end of the pre-air-conditioning, the mobile terminal 300 displays a notification/selection screen G4 illustrated in FIG. 8. On the notification/selection screen G4, the guidance notification M1 "REMOTE AIR-CONDITIONING OPERATION WILL STOP" is displayed. Below the guidance notification M1, the state notification M2 regarding the vehicle state indicating the set temperature, the vehicle-interior temperature, and the remaining battery level is displayed. Below the state notification M2, a guide message M3 "EXTEND AIR-CONDITIONING OPERATION?" is displayed. Below the guide message M3, an extension selection button B5 with an indication "YES" for commanding extension of the air-conditioning and an extension non-selection button B6 with an indication "NO" for commanding non-extension of the air-conditioning are displayed. The extension selection button B5 and the extension non-selection button B6 are the same as the continuation selection button B2 and the stop selection button B1 in terms of functions. However, the indicated contents are different from those of the stop selection button B1 and the continuation selection button B2 so as to provide the function of extending a pre-air-conditioning end time from that during a normal operation.

Figure 9:
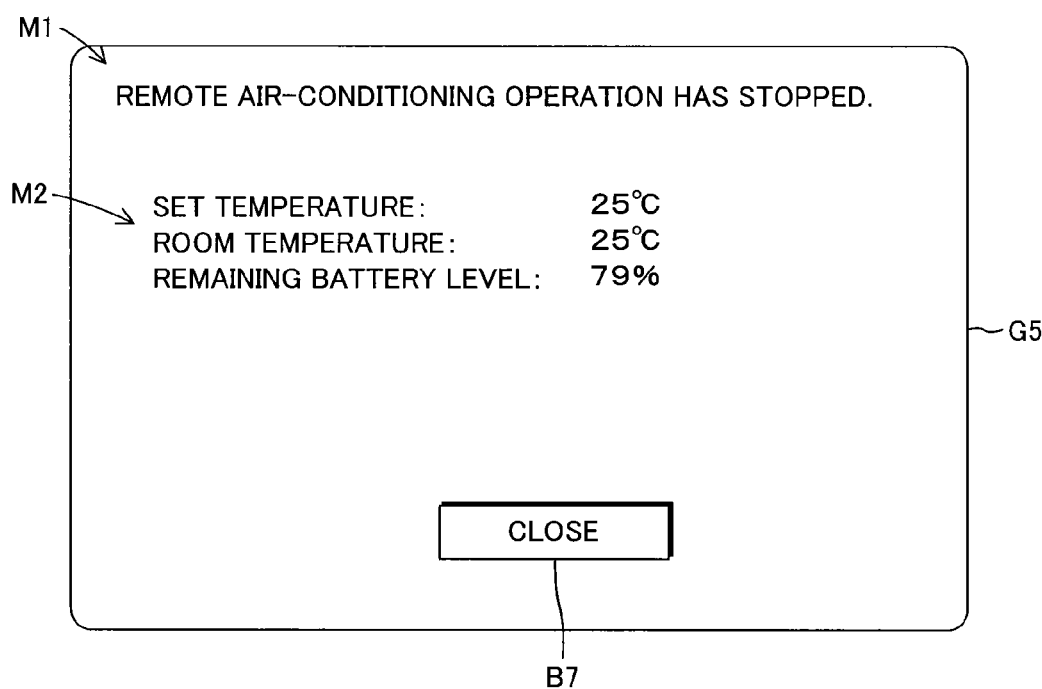
FIG. 9 illustrates a further display screen of the mobile terminal.

When the notification condition is satisfied in synchronization with the termination of actuation of the pre-air-conditioning (S27: Yes) and the vehicle-interior temperature reaches the set temperature at the end of the pre-air-conditioning, the mobile terminal 300 displays a notification screen G5 illustrated in FIG. 9. On the notification screen G5, the guidance notification M1 "REMOTE AIR-CONDITIONING OPERATION HAS STOPPED" and the state notification M2 regarding the vehicle state indicating the current set temperature, the vehicle-interior temperature, and the remaining battery level are displayed. Below the state notification M2, a close button B7 with an indication "CLOSE" for ending the remote control program for the pre-air-conditioning is displayed. For the notification screen G5, selection display for selecting the continuation/termination of the pre-air-conditioning is not performed.

Figure 5:
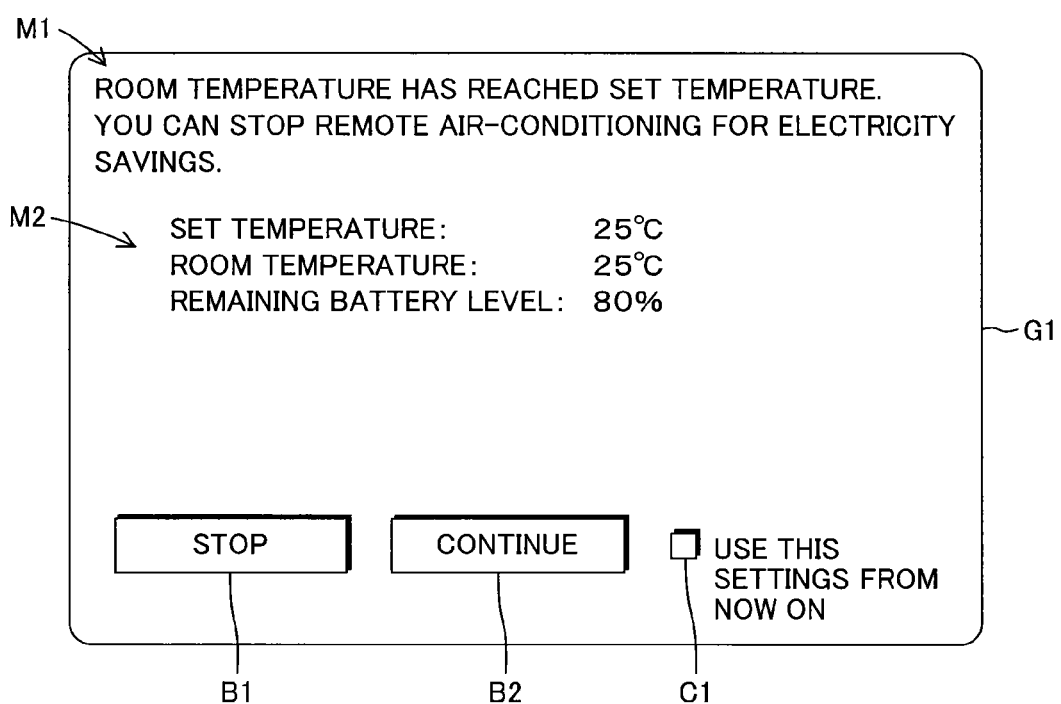
FIG. 5 illustrates a display screen of a mobile terminal.
Figure 6:
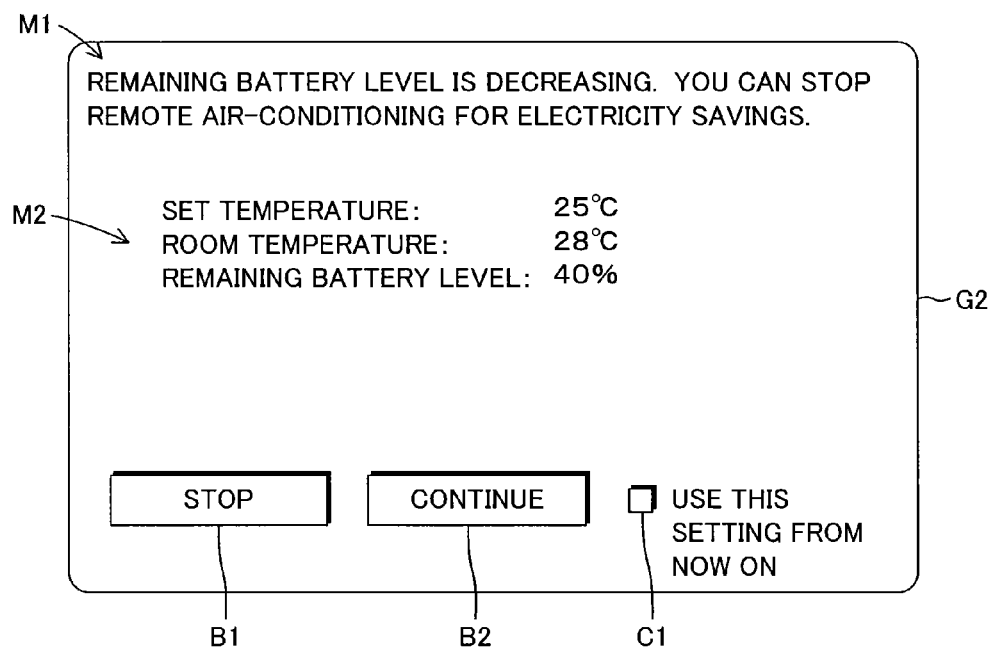
FIG. 6 illustrates another display screen of the mobile terminal.
Figure 7:
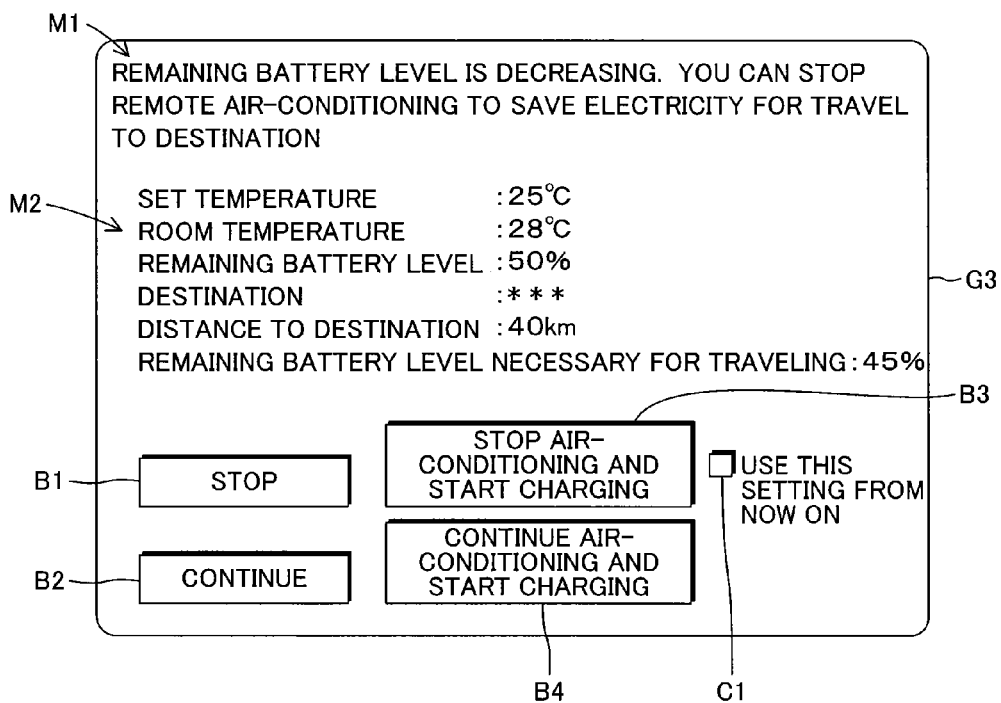
FIG. 7 illustrates a further display screen of the mobile terminal.

On the screens G1 to G3 illustrated in FIGS. 5 to 7, a selection skip check box C1 for eliminating the need of performing a selection operation by the user each time is displayed. In order to change the setting after the selection skip check box C1 is checked, the setting can be changed on a setting-mode screen by selecting a setting mode for the pre-air-conditioning application.

After displaying the notification/selection screen, in subsequent Step S35, the mobile terminal 300 waits for input of an operation of the selection button by the user. When detecting the operation input, in Step S36, the mobile terminal 300 transmits the selection information indicating the contents of selection to the server 210. When the selection skip check box C1 is checked, selection skip check box information is also transmitted to the server 210.

When receiving the selection information transmitted from the mobile terminal 300, in Step S37, the server 210 transfers the selection information to the DCM 150. In this case, when the selection skip check box information is transmitted from the mobile terminal 300, the server 210 also transfers the selection skip check box information to the DCM 150. When receiving the selection information transmitted from the server 210, the DCM 150 performs processing specified by the selection information. Specifically, a pre-air-conditioning continuation command or a pre-air-conditioning termination command is transmitted to the air-conditioning ECU 110a. When the start of the battery charging is selected, a battery charging start command is transmitted to the charging ECU 110b.

The air-conditioning ECU 110a controls the actuation of the air-conditioning device 180 in accordance with the command from the DCM 150. The charging ECU 110b starts controlling the charger 131 in accordance with the command from the DCM 150.

When receiving the pre-air-conditioning continuation command, the air-conditioning ECU 110a actuates the air-conditioning device 180 for, for example, a predetermined given time period. Alternatively, the air-conditioning device is actuated until an actuation set time period elapses from the first start of the air-conditioning. Further alternatively, the air-conditioning device is actuated until the vehicle-interior temperature reaches the set temperature. When the actuation of the air-conditioning device 180 is continued, it is preferred that the DCM 150 perform the notification-condition satisfaction determination processing, excluding the previously satisfied notification condition. When receiving the selection skip check box information, the DCM 150 stores the reason of satisfaction of the notification condition and the contents of selection at the time. When the stored reason of satisfaction of the notification condition is subsequently satisfied, the processing in Steps S31 and S32 is skipped and processing in Step S38 is executed with the stored contents of selection. In this manner, an automatic selection which meets the user's requirements is made so as to omit the selection operation by the user.

Next, setting of pre-air-conditioning priority is described. The remote control system for pre-air-conditioning of this embodiment has a function of presetting priority regarding pre-air-conditioning. On the pre-air-conditioning application executed by the mobile terminal 300, the priority setting function is set ON so that the continuation or the termination of the pre-air-conditioning is automatically selected based on the priority preset by the user when the notification condition is satisfied. For a priority setting operation, not only the mobile terminal 300 but also an operation panel provided to the vehicle 100 or the like can be used.

Figure 10:
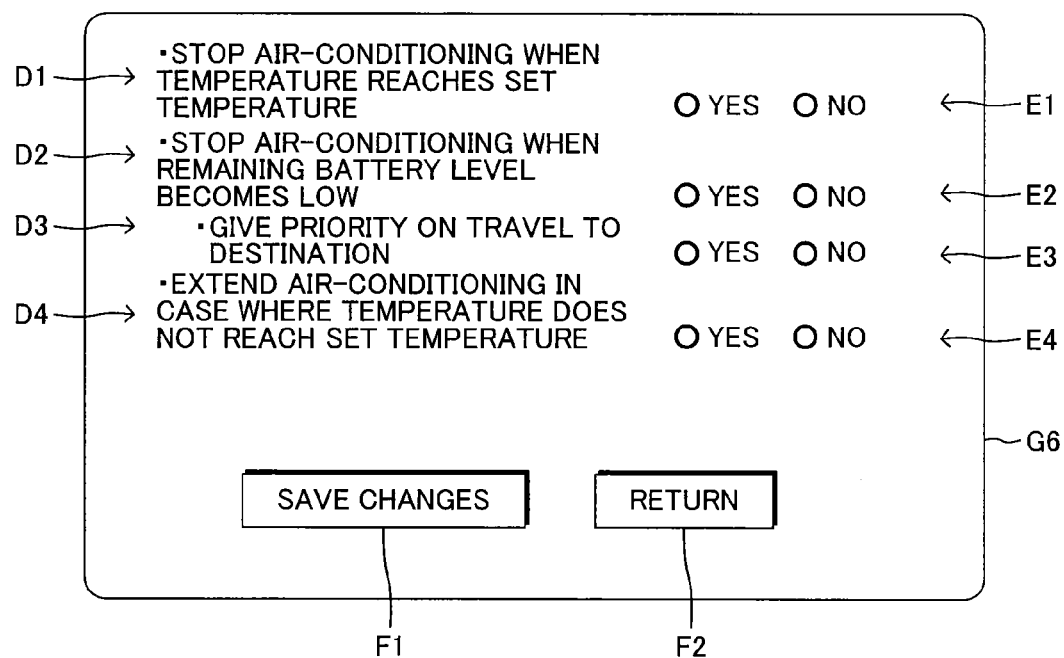
FIG. 10 illustrates a pre-air conditioning priority setting screen of the mobile terminal.

When the priority setting function is set ON on a setting screen for the pre-air-conditioning application, the mobile terminal 300 displays a pre-air-conditioning priority setting screen G6 illustrated in FIG. 10. On the pre-air-conditioning priority setting screen G6, four setting items D1, D2, D3, and D4 are displayed. For the respective items, selection buttons (radio buttons) E1, E2, E3, and E4 are respectively provided. The first setting item D1 is an item for setting whether or not to terminate the pre-air-conditioning when the vehicle-interior temperature reaches the set temperature before the pre-air-conditioning set time period elapses (priority on electricity savings). The second setting item D2 is an item for setting whether or not to terminate the pre-air-conditioning when the remaining battery level becomes lower than the set value during the pre-air-conditioning (priority on the remaining battery level). The third setting item D3 is an item for setting whether or not to terminate the pre-air-conditioning when the destination is set for navigation and the remaining battery level is insufficient for the travel to the destination (priority on the travel to the destination). The fourth item D4 is an item for setting whether or not to extend the pre-conditioning when the vehicle-interior temperature does not reach the set temperature even after the pre-air-conditioning is performed for the actuation set time period (priority on the temperature). Below the setting item D4, a save button F1 and a return button F2 are displayed.

After the pre-air-conditioning priority is selected and set by the selection buttons E1, E2, E3, and E4 and the save button F1 is touched, the mobile terminal 300 transmits the setting information of the pre-air-conditioning priority to the DCM 150. The DCM 150 stores the latest priority setting information in the memory of the main control section 152. When the notification condition is satisfied during the pre-air-conditioning (S30: Yes), the DCM 150 transmits the pre-air-conditioning continuation command or the pre-air-conditioning termination command in accordance with the stored pre-air-conditioning priority to the air-conditioning ECU 110a.

In the case where "YES" is set for the first setting item D1, the DCM 150 transmits the pre-air-conditioning termination command to the air-conditioning ECU 110a when the vehicle-interior temperature reaches the set temperature during the pre-air-conditioning before elapse of the set time period. In the case where "NO" is set, the pre-air-conditioning command is not transmitted even when the vehicle-interior temperature reaches the set temperature during the pre-air-conditioning before elapse of the set time period. In the case where "YES" is set for the second setting item D2, the pre-air-conditioning termination command is transmitted to the air-conditioning ECU 110a when the remaining battery level becomes lower than the set value during the pre-air-conditioning. In the case where "NO" is set, the pre-air-conditioning termination command is not transmitted to the air-conditioning ECU 110a even when the remaining battery level becomes lower than the set value during the pre-air-conditioning. In the case where "YES" is set for the third setting item D3, the pre-air-conditioning termination command is transmitted to the air-conditioning ECU 110a only when the destination for navigation is set and the remaining battery level is insufficient for the travel to the destination. In the case where "NO" is set, the pre-air-conditioning termination command is transmitted to the air-conditioning ECU 110a when the remaining battery level becomes lower than the set value during the pre-air-conditioning regardless of whether or not the travel to the destination is possible. In the case where "YES" is set for the fourth setting item D4, the pre-air-conditioning continuation command is transmitted to the air-conditioning ECU 110a when the vehicle-interior temperature does not reach the set temperature even after the pre-air-conditioning is performed for the actuation set time period. In the case where "NO" is set, the pre-air-conditioning continuation command is not transmitted to the air-conditioning ECU 110a even when the vehicle-interior temperature does not reach the set temperature after the pre-air-conditioning is performed for the actuation set time period.

In the case where the priority setting function is set ON, the DCM 150 changes the notification condition in the notification condition satisfaction determination routine (S20 in FIG. 3) to the condition described above in the flow illustrated in FIG. 2. Then, when the condition is satisfied (S30: Yes), the notification/selection screen content setting processing (S31) and the processing for transmitting the notification/selection screen content information (S32) are skipped. Then, in Step S38, the pre-air-conditioning continuation command or the pre-air-conditioning termination command is transmitted to the air-conditioning ECU 110a. The processing in Steps S31 and S32 may be executed without being skipped. In this case, the user can know the vehicle state during the pre-air-conditioning by the mobile terminal 300.

The air-conditioning ECU 110a may acquire and store the pre-air-conditioning priority from the DCM 150 so as to control the actuation of the air-conditioning device 180 in accordance with the conditions which are set based on the pre-air-conditioning priority. Specifically, instead of the transmission of the pre-air-conditioning continuation command or the pre-air-conditioning termination command to the air-conditioning ECU 110a by the DCM 150, the air-conditioning ECU 110a may control the continuation or the termination of the actuation of air-conditioning in accordance with the conditions which are set based on the pre-air-conditioning priority.

According to the above-mentioned remote control system for pre-air-conditioning of this embodiment, whether or not the preset notification condition is satisfied is determined during the execution of the pre-air-conditioning. When the notification condition is satisfied, the guidance notification describing the vehicle state, the state notification indicating the vehicle state in numerical values, and the selection button for selection of the continuation/termination of the pre-air-conditioning are displayed on the display 304 of the mobile terminal 300. Therefore, the user can be invited to determine whether or not to continue/termination the pre-air-conditioning at the time. As a result, the user can make an appropriate selection in consideration of the current vehicle state (the vehicle-interior temperature and the remaining battery level), his/her own plan, a life style, or the like in a comprehensive manner. Therefore, inconvenience such as the stop of pre-air-conditioning or the continuation of pre-air-conditioning against the user's will can be suppressed. For example, the user who puts priority on electricity savings or the charged state of the battery 170 can select the termination of the pre-air-conditioning based on the guidance notification or the state notification. The user who puts priority on comfort in the vehicle interior can select the continuation (extension) of the pre-air-conditioning based on the displayed vehicle-interior temperature.

In the case where the destination for navigation is set, the notification condition is set so as to ensure the required remaining level XL which is the remaining battery level necessary for the travel from the self-vehicle position to the destination. Therefore, the remaining battery level does not become lower than the required remaining level XL due to the pre-air-conditioning against the user's will. Thus, the user's travel plan can be prevented from going wrong due to the pre-air-conditioning.

Moreover, when the remaining battery level becomes lower than the set remaining level Xs, a selection for the execution of battery charging can be simultaneously made along with the selection for continuation/termination of the pre-air-conditioning. Therefore, extremely high usability is provided. Moreover, when the start of battery charging is selected, the battery charging is directly started. Thus, the usability is further improved.

Moreover, the selection to continue or terminate the pre-air-conditioning can be made on the display screen at the time of notification. Therefore, the operation is extremely easy. Thus, the user does not hesitate in the selection operation.

Moreover, when the pre-air-conditioning priority setting is used, the selection for the continuation and termination of the pre-air-conditioning can be set in advance for each vehicle state in accordance with the user's preference. Thus, the selection operation is not required to be performed during the pre-air-conditioning. Further, communication processing between the DCM 150 and the mobile terminal 300 can be correspondingly reduced.

Next, remote control for battery charging is described. Even for the remote control for battery charging, a flow of the information between the mobile terminal 300, the server 210 of the vehicle information center 200, and the DCM 150 of the vehicle 100 is the same as that of the flowchart of FIG. 2. Differences lie in that the in-vehicle device which is a target to be remotely controlled is the battery charging device 130, and in the notification-condition satisfaction determination processing and the notification/selection screen content setting processing. In the following, processing different from the processing for pre-air-conditioning is described.

Figure 11:
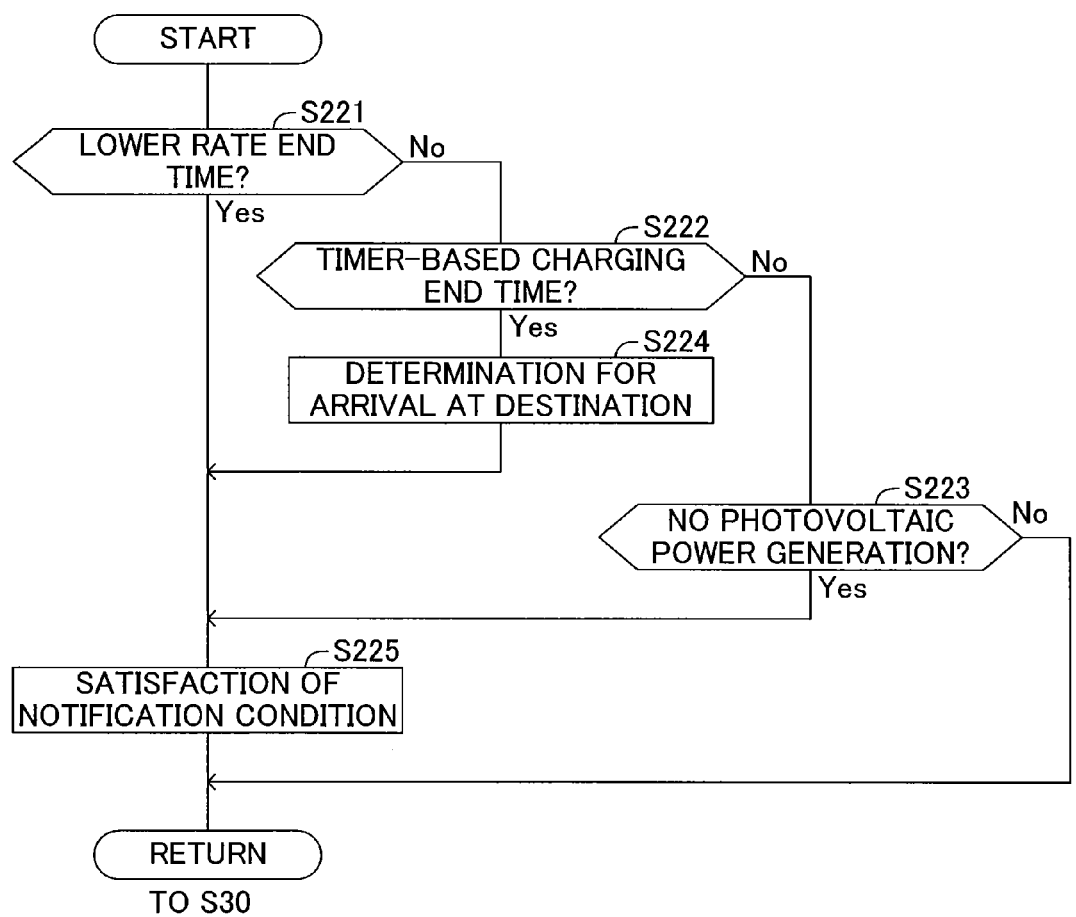
FIG. 11 is a flowchart illustrating the notification-condition satisfaction determination routine.

FIG. 11 is a flowchart illustrating the notification-condition satisfaction determination routine in Step S20 during the battery charging. When the notification-condition satisfaction determination routine is started, the DCM 150 (main control section 152) determines in Step S221 whether or not the current time is a time at which a lower electricity-rate time period ends. For example, it is determined whether or not the current time is a time at which a nighttime electricity-rate time period ends (for example, 7 AM). When determining that the current time is not the time at which the lower electricity-rate time period ends, in subsequent Step S222, the DCM 150 determines whether or not the current time is a timer-based charging end time. For the timer-based charging of the battery, the user can specify a time at which the battery charging ends (referred to as "timer-based charging end time"). In Step S222, the DCM 150 reads the timer-based charging end time from the charging ECU 110b and makes the determination described above. When the timer-based charging end time is managed externally (for example, by the mobile terminal 300, the server 210, or an HEMS), the DCM 150 makes an access to the exterior to acquire the timer-based charging information, and makes the determination described above.

When determining that the current time is not the timer-based charging end time, in subsequent Step S223, the DCM 150 determines whether or not photovoltaic power generation is unavailable under the current condition. In this case, a time period in which it is supposed that the photovoltaic power generation is unavailable is preset, and the DCM 150 determines whether or not the current time falls within the time period. Alternatively, in a household equipped with, for example, a home energy management system (HEMS), the amount of photovoltaic power generation is measured in real time. Therefore, information indicating the measured amount of photovoltaic power generation is acquired from the HEMS so as to make a determination based on whether or not the amount of photovoltaic power generation per unit time becomes lower than a reference value. In this case, for example, the DCM 150 may perform power line communication (PLC) to/from the HEMS through the charging cable 190 to acquire the information indicating a photovoltaic power generation condition. Alternatively, the external communication control section 151 or the near-range communication control device 160 may be used to acquire the information indicating the photovoltaic power generation condition from the HEMS by wireless communication.

When determining "No" in Step S223, that is, the current condition is not a condition under which the photovoltaic power generation is unavailable, the DCM 150 temporarily exits the notification-condition satisfaction determination routine without the satisfaction of the notification condition. In subsequent Step S30 (FIG. 2), it is determined whether or not the notification condition is satisfied. In this case, the notification condition is not satisfied yet. Therefore, the DCM 150 executes the notification-condition satisfaction determination routine (S20) again.

The DCM 150 repeats the determination processing in Steps S221 to S223. The notification-condition satisfaction determination routine is executed during the battery charging. When the remaining battery level becomes equal to the set value (for example, the full charge level), the notification-condition satisfaction determination routine is terminated with the completion of the battery charging. Therefore, when "Yes" is determined as the determination in Steps S221 to S223, the remaining battery level is insufficient for the set value.

When "Yes" is determined in the determination processing in at least any one of Steps S221 to S223, the DCM 150 determines in Step S225 that the notification condition is satisfied. Specifically, when at least any one of the three determination conditions (the current time reaches the lower electricity-rate end time, the current time reaches the timer-based charging end time, and the current time reaches the photovoltaic power generation end time (insufficient amount of power generation)) is satisfied during the battery charging, it is determined that the notification condition is satisfied at that time.

In this case, when determining "Yes" in Step S222, that is, the current time reaches the timer-based charging end time, in Step S224, the DCM 150 executes processing for determining whether or not the arrival at the destination is possible with the current remaining battery level. The processing is performed in the same manner as in Steps S101 to S105 of the above-mentioned set remaining level setting routine for pre-air-conditioning. Specifically, the DCM 150 reads the destination setting information from the navigation device 140 and determines whether or not the destination for navigation is set. When the destination is set, the DCM 150 reads the information indicating the predicted travel distance L which is the length of the traveling path from the self-vehicle position to the destination from the navigation device 140 and calculates the required remaining level XL necessary for the travel over the predicted travel distance L. Then, by comparing the set remaining level Xs (XL+A) obtained by adding the extra amount A to the required remaining level XL and the current remaining battery level X, it is determined whether or not the arrival at the destination is possible with the current remaining battery level. The result of determination is reflected on the contents of the notification/selection screen of the mobile terminal 300, which are described later.

When the notification condition is satisfied in the above-mentioned manner, "Yes" is determined in Step S30. Then, the processing by the DCM 150 proceeds to Step S31.

In the notification-condition satisfaction determination routine, the determination processing in Step S224 is executed when the current time reaches the timer-based charging end time (S222: Yes). However, the determination processing may also be executed at the time at which the lower electricity-rate time period ends (S221: Yes) or may also be executed when the photovoltaic power generation becomes unavailable under the current condition (S223: Yes). Moreover, in Step S221, whether or not the current time reaches the time at which the lower electricity-rate time period ends is determined. Instead, whether or not the current time is out of the lower electricity-rate time period may be determined.

In this embodiment, the notification-condition determination routine is executed by the main control section 152 of the DCM 150. However, the charging ECU 110b may execute the notification-condition satisfaction determination routine and transmit the result of satisfaction of the notification condition to the DCM 150. Further, the determination processing may be distributed to the other ECUs 110.

In Step S31, the DCM 150 (main control section 152) executes the notification/selection screen content setting processing in accordance with the reason of satisfaction of the notification condition. In the remote control system for battery charging, when the notification condition is satisfied, the selection display for allowing the user to select whether to continue or terminate the battery charging is performed by using the mobile terminal 300 as described later. At this time, the information regarding the vehicle state (such as the vehicle-interior temperature and the remaining battery level) and the reason of satisfaction of the notification condition are simultaneously notified so as to assist the selection and determination by the user. For the notification, in Step S31, the DCM 150 sets the contents (such as the guidance notification, the state notification, and the selection button described later) necessary for the screen display on the mobile terminal 300. In this case, the DCM 150 acquires information necessary for the state notification from the charging ECU 110b and the navigation device 140. The contents of the notification/selection screen set in Step S31 are described in the description of the notification/selection screen on the mobile terminal 300, which is given later. Therefore, the description thereof is herein omitted. When the notification/selection screen content setting processing is completed, in Step S32, the DCM 150 transmits the notification/selection screen content information indicating the notification/selection screen contents to the server 210.

Figure 12:
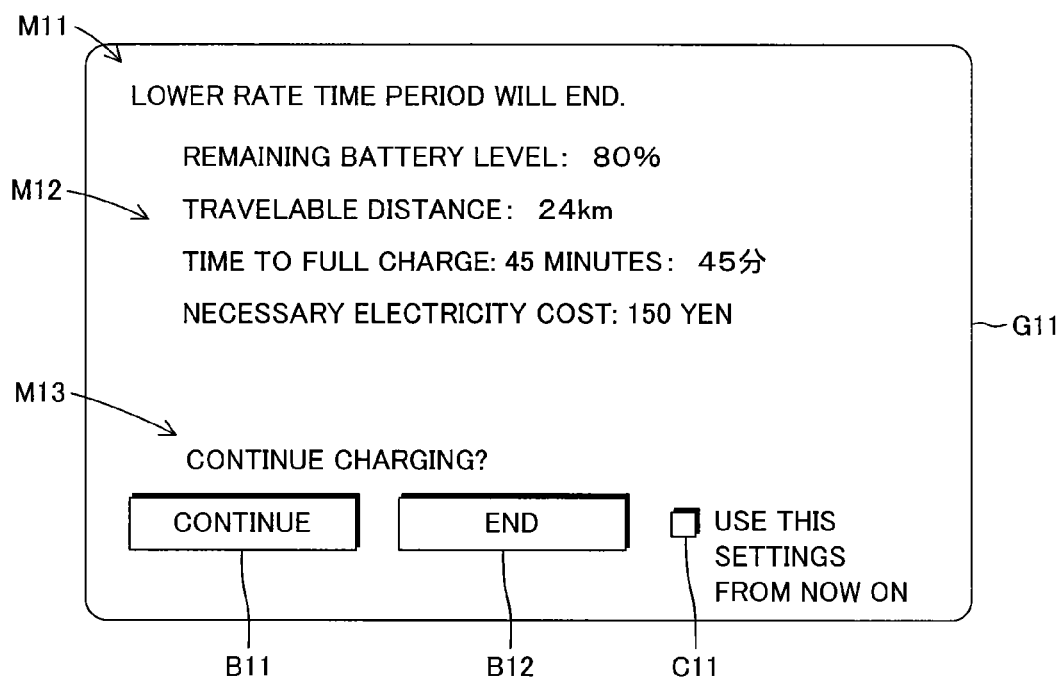
FIG. 12 is a further display screen of the mobile terminal.

Next, the notification/selection screen displayed on the display 304 of the mobile terminal 300 is described. The notification/selection screen is set so as to be different in accordance with the reason of satisfaction of the notification condition. When the current time reaches the lower electricity-rate end time during the battery charging to satisfy the notification condition (S221: Yes), the mobile terminal 300 displays a notification/selection screen G11 illustrated in FIG. 12. On the notification/selection screen G11, a guidance notification M11 "LOWER ELECTRICITY-RATE TIME PERIOD WILL END." is displayed. Below the guidance notification M11, a state notification M12 regarding the vehicle state, which indicates the remaining battery level (charging rate), a distance over which the travel is possible with the remaining battery level, time required for fully charge the battery 170, and electricity cost required for charging, is displayed. Below the state notification M12, a guide massage M13 "CONTINUE CHARGING?" is displayed. Below the guide massage M13, a continuation selection button B11 with an indication "YES" for commanding the continuation of battery charging and a stop selection button B12 with an indication "NO" for commanding the termination of battery charging are displayed.

Figure 13:
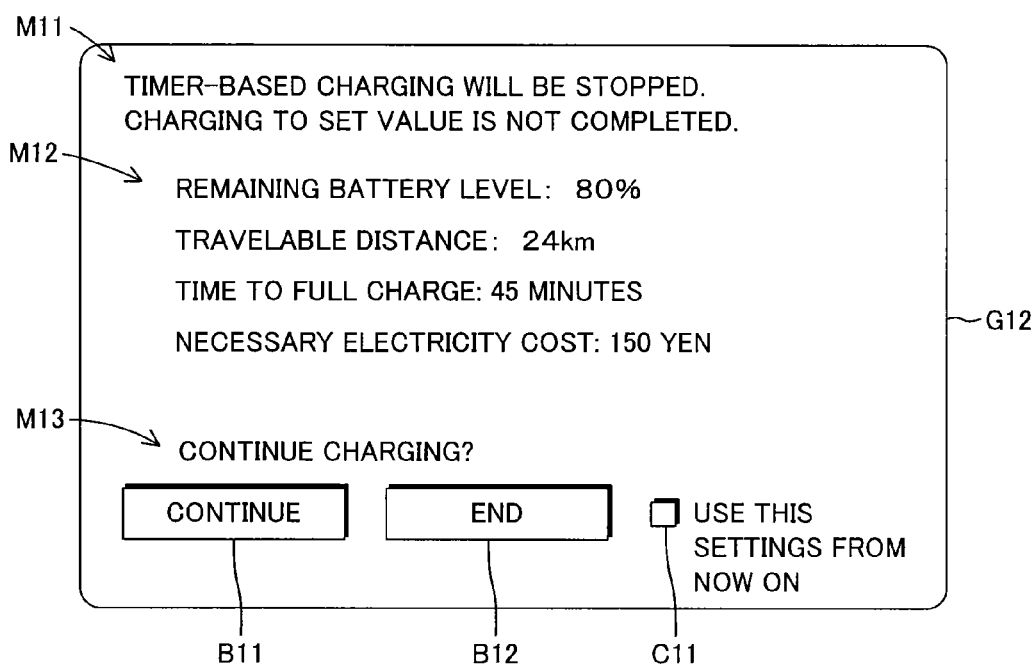
FIG. 13 is a further display screen of the mobile terminal.

When the current time reaches the timer-based charging end time before the completion of the battery charging to satisfy the notification condition (S222: Yes) and in the case where the destination is not set in the navigation device 140, the mobile terminal 300 displays a notification/selection screen G12 illustrated in FIG. 13. On the notification/selection screen G12, the guidance notification M11 "TIMER-BASED CHARGING WILL END. CHARGING TO SET VALUE IS NOT COMPLETED." is displayed. Below the guidance notification M11, the state notification M12 regarding the vehicle state, which indicates the remaining battery level, the distance over which the travel is possible with the remaining battery level, time required to fully charge the battery 170, and the electricity cost required for charging, is displayed. Below the state notification M12, the guide massage M13 "CONTINUE CHARGING?" is displayed. Below the guide massage M13, the continuation selection button B11 and the stop selection button B12 are displayed. When the destination is set in the navigation device 140 but the current remaining battery level is above a battery level required for the travel to the destination (XL+A obtained by adding the extra amount A to the required remaining level XL), the notification/selection screen G12 is also displayed.

Figure 14:
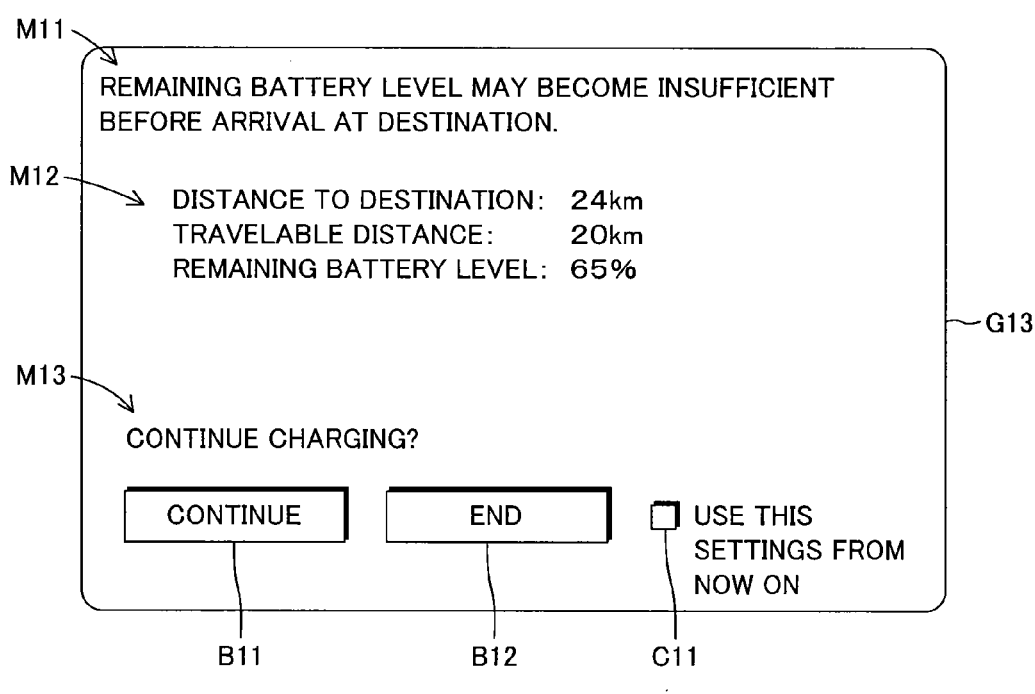
FIG. 14 is a further display screen of the mobile terminal.

When the current time reaches the timer-based charging end time before the completion of the battery charging to satisfy the notification condition (S222: Yes) and in the case where the destination is set in the navigation device 140 and it is determined that the current remaining battery level is insufficient for the battery level required for the travel to the destination, the mobile terminal 300 displays a notification/selection screen G13 illustrated in FIG. 14. On the notification/selection screen G13, the guidance notification M11 "REMAINING BATTERY LEVEL MAY BE INSUFFICIENT BEFORE ARRIVAL AT DESTINATION." is displayed. Below the guidance notification M11, the state notification M12 regarding the vehicle state, which indicates the distance to the destination, the distance over which the travel is possible with the remaining battery level, and the remaining battery level, is displayed. Below the state notification M12, the guide massage M13 "CONTINUE CHARGING?" is displayed. Below the guide massage M13, the continuation selection button B11 and the stop selection button B12 are displayed.

Figure 15:
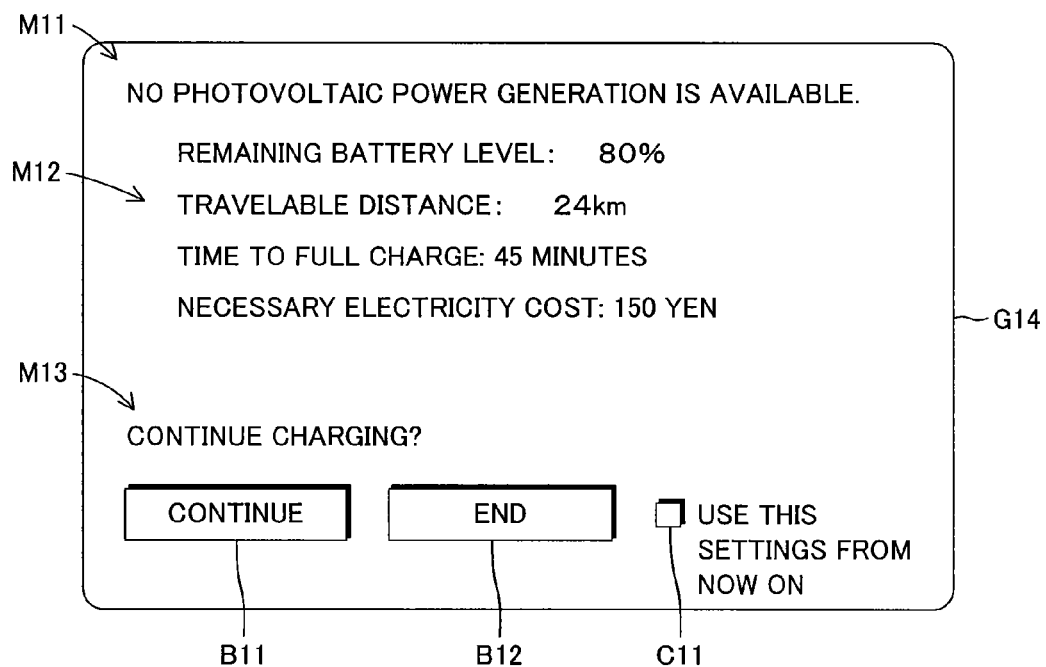
FIG. 15 is a further display screen of the mobile terminal.

When the notification condition corresponding to the insufficient amount of photovoltaic power generation is satisfied (S223: Yes), the mobile terminal 300 displays a notification/selection screen G14 illustrated in FIG. 15. On the notification/selection screen G14, the guidance notification M11 "NO PHOTOVOLTAIC POWER GENERATION IS AVAILABLE." is displayed. Below the guidance notification M11, the state notification M12 regarding the vehicle state, which indicates the remaining battery level, the distance over which the travel is possible with the remaining battery level, time required to fully charge the battery 170, and the electricity cost required for charging, is displayed.

Below the state notification M12, the guide massage M13 "CONTINUE CHARGING?" is displayed. Below the guide massage M13, the continuation selection button B11 and the stop selection button B12 are displayed.

On the screens G11 to G14 illustrated in FIGS. 12 to 15, a selection skip check box C11 for eliminating the need of performing a selection operation by the user each time is displayed. In order to change the setting on the selection skip check box C11, the setting can be changed on a setting-mode screen by selecting a setting mode for a battery-charging application.

After displaying the notification/selection screen, in subsequent Step S35, the mobile terminal 300 waits for input of an operation of the selection button by the user. When detecting the operation input, in Step S36, the mobile terminal 300 transmits the selection information indicating the contents of selection to the server 210. When the selection skip check box C11 is checked, selection skip check box information is also transmitted to the server 210.

When receiving the selection information transmitted from the mobile terminal 300, in Step S37, the server 210 transfers the selection information to the DCM 150. In this case, when the selection skip check box information is transmitted from the mobile terminal 300, the server 210 also transfers the selection skip check box information to the DCM 150. When receiving the selection information transmitted from the server 210, the DCM 150 performs processing specified by the selection information. Specifically, a battery-charging continuation command or a battery-charging termination command is transmitted to the charging ECU 110b. In the above-mentioned manner, the charging ECU 110b controls the actuation of the charger 131 in accordance with the command from the DCM 150.

When transmitting the battery-charging continuation command to the charging ECU 110b, the DCM 150 restarts the notification-condition satisfaction determination processing in Step S20. In this case, the notification-condition satisfaction determination processing is performed, excluding the previously satisfied notification condition. When receiving the selection skip check box information, the DCM 150 stores the reason of satisfaction of the notification condition and the contents of selection at the time. When the stored reason of satisfaction of the notification condition is subsequently satisfied, the processing in Steps S31 and S32 is skipped and processing in Step S38 is executed with the stored contents of selection. In this manner, an automatic selection which meets the user's requirements is made so as to omit the selection operation by the user.

Next, setting of charging priority is described. The remote control system for battery charging of this embodiment has a function of presetting priority regarding battery-charging. On the battery charging application executed by the mobile terminal 300, the priority setting function is set ON so that the continuation or the termination of the battery charging is automatically selected based on the priority set by the user when the notification condition is satisfied. For a priority setting operation, not only the mobile terminal 300 but also an operation panel provided to the vehicle 100, an operation panel provided on the power-feeding device side serving as an external power supply, or the like can be used.

Figure 16:
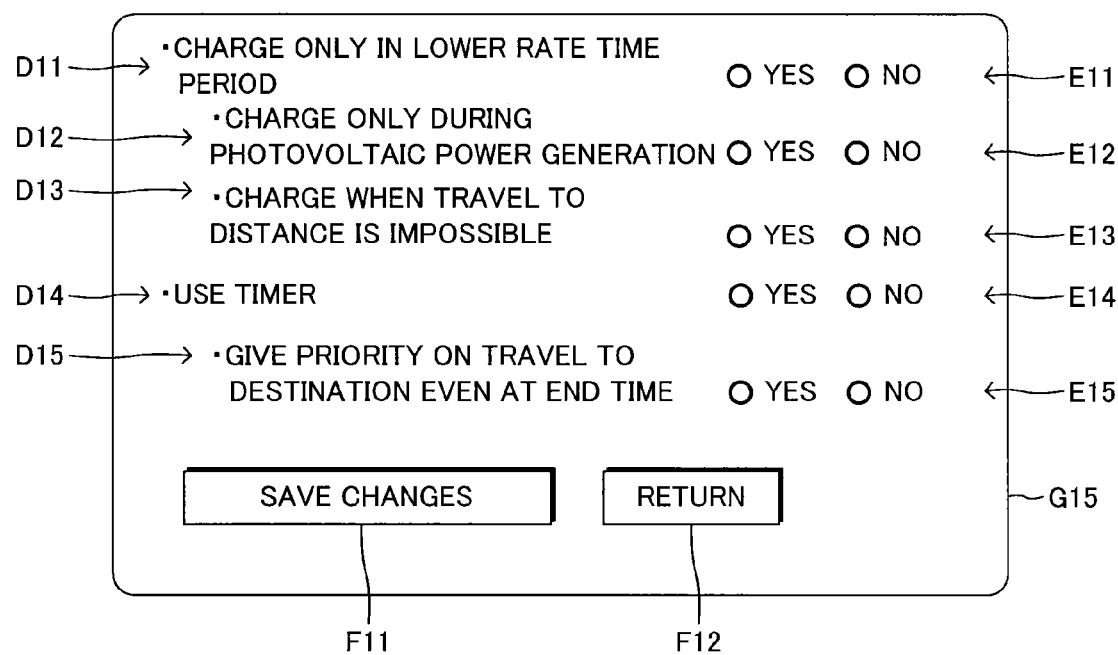
FIG. 16 is a charging priority setting screen of the mobile terminal.

When the priority setting function is set ON on a setting screen for the battery-charging application, the mobile terminal 300 displays a charging priority setting screen G15 illustrated in FIG. 16. On the charging priority setting screen G15, five setting items D11, D12, D13, D14, and D15 are displayed. For the respective items, selection buttons (radio buttons) E11, E12, E13, E14, and E15 are respectively provided. The first setting item D11 is an item for setting whether or not to charge the battery preferentially in the lower electricity-rate time period. The second setting item D12 is an item for setting whether or not to charge the battery preferentially during the photovoltaic power generation. The third setting item D13 is an item for setting whether or not to charge the battery in a time period which is not the lower electricity-rate time period when the remaining battery level is so insufficient that the travel to the destination is not possible in the case where the battery is to be charged preferentially in the lower electricity-rate time period. The fourth setting item D14 is an item for setting whether or not to terminate the battery charging (to put priority on the charging end time) when the remaining battery level does not reach the set value yet at the timer-based charging end time in the case where the timer-based charging is performed. The fifth setting item D15 is an item for setting whether or not to charge the battery when the priority is put on the timer-based charging end time and the remaining battery level is so insufficient that the travel to the distance is not possible at the timer-based charging end time. Below the setting item D15, a save button F11 and a return button F12 are displayed.

After the battery charging priority is selected and set by the selection buttons E11, E12, E13, E14, and E15 and the save button F11 is touched, the mobile terminal 300 transmits the setting information of the charging priority to the DCM 150. The DCM 150 stores the latest priority setting information. When the notification condition is satisfied during the battery charging control (S30: Yes), the DCM 150 transmits the battery charging continuation command or the battery charging termination command in accordance with the stored charging priority to the charging ECU 110a.

When "Yes" is set for the first setting item D11, the DCM 150 transmits the battery charging termination command to the charging ECU 110b at the lower electricity-rate end time. When "No" is set, the battery charging termination command is not transmitted even when the current time reaches the lower electricity-rate end time. When "Yes" is set for the second setting item D12, the battery charging termination command is transmitted to the charging ECU 110b when the photovoltaic power generation is unavailable under the current condition. When "No" is set, the battery charging termination command is not transmitted even when the photovoltaic power generation is unavailable under the current condition. When "Yes" is set for the third setting item D13, the battery charging termination command is transmitted to the charging ECU 110b when the lower electricity-rate time period ends, except for the case where the remaining battery level is insufficient for the travel to the destination under the current condition. When "No" is set, the battery charging termination command is transmitted at the lower rate end time regardless of whether or not the remaining battery level is insufficient for the travel to the destination under the current condition. When "Yes" is set for the fourth setting item D14, the battery charging command is not transmitted even in the case where the remaining battery level does not reach the set value at the timer-based charging end time. In this case, the batter charging is not continued and ends at the timer-based charging end time. When "No" is set for the fourth setting item D14, the battery charging continuation command is transmitted to the charging ECU 110b in the case where the remaining battery level does not reach the set value at the timer-based charging end time. When "Yes" is set for the fifth setting item D15, the battery charging continuation command is transmitted to the charging ECU 110b only in the case where the remaining battery level is insufficient for the travel to the destination at the timer-based end time. When "No" is set, the battery charging continuation command is transmitted in the case where the remaining battery level does not reach the set value at the timer-based charging end time regardless of whether or not the travel to the destination is possible.

In the case where the priority setting function is set ON, the DCM 150 changes the notification condition in the notification condition satisfaction determination routine (S20 in FIG. 11) to the condition described above in the flow illustrated in FIG. 2. Then, when the condition is satisfied (S30: Yes), the notification/selection screen content setting processing (S31) and the processing for transmitting the notification/selection screen content information (S32) are skipped. Then, in Step S38, the battery-charging continuation command or the battery-charging termination command is transmitted to the charging ECU 110*b*. The processing in Steps S31 and S32 may be executed without being skipped. In this case, the user can know the vehicle state during the battery charging by the mobile terminal 300.

The charging ECU 110*b* may acquire and store the charging priority from the DCM 150 so as to control the actuation of the charging device 130 in accordance with the conditions which are set based on the charging priority. Specifically, instead of the transmission of the battery-charging continuation command or the battery-charging termination command to the charging ECU 110*b* by the DCM 150, the charging ECU 110*b* may control the continuation or the termination of the actuation of the charging device 130 (charger 131) in accordance with the conditions which are set based on the charging priority.

According to the above-mentioned remote control system for battery charging of this embodiment, whether or not the preset notification condition is satisfied is determined during the execution of the battery charging. When the notification condition is satisfied, the guidance notification describing the vehicle state, the state notification indicating the vehicle state in numerical values, and the selection button for selection of the continuation/termination of the battery charging are displayed on the display 304 of the mobile terminal 300. Therefore, the user can be invited to determine whether or not to continue/termination the battery charging at the time. As a result, the user can make an appropriate selection in consideration of the current vehicle state (such as the charged state of the battery and the electricity cost required for charging), his/her own plan, a life style, or the like in a comprehensive manner. Therefore, inconvenience such as the stop of battery charging or the continuation of battery charging against the user's will can be suppressed. For example, the user who desires to cut the electricity cost for charging the battery can select the termination of the battery charging when the lower electricity-rate time period ends. Moreover, the user who desires to quickly complete the battery charging can select the continuation of the battery charging, with priority on the end time over the electricity cost.

In the case where the remaining battery level at the timer-based charging end time is below the battery level required for the arrival at the destination, a notification indicating the insufficient remaining battery level is made. Thus, the user's travel plan can be prevented from going wrong due to the insufficient remaining battery level.

Moreover, the selection to continue or terminate the battery charging can be made on the display screen at the time of notification. Therefore, the operation is extremely easy. Thus, the user does not hesitate in the selection operation.

Moreover, when the battery-charging priority setting is used, the selection for the continuation and termination of the battery charging can be set in advance for each type of vehicle state (state including a vehicle environment) in accordance with the user's preference. Thus, the selection operation is not required to be performed during the battery charging. Further, communication processing between the DCM 150 and the mobile terminal 300 can be correspondingly reduced.

The vehicle remote control system according to this embodiment has been described above. The present invention is not limited to the embodiment described above. Various changes are possible without departing from the object of the present invention.

For example, in this embodiment, the notification-condition satisfaction determination processing, the notification/selection screen content setting processing, and the notification/selection screen content transmission processing (S20 to S32) are executed by the DCM 150 (main control section 152) of the vehicle 100. However, notification-condition satisfaction determination processing (S20' to S30') and notification/selection screen content setting processing (S31') may be performed by the server 210 of the vehicle information center 200 as indicated by the broken line in FIG. 2 without executing the above-mentioned processing by the DCM 150. The processing in Steps S20' to S30' and Step S31' is the same as that in Steps S20 to S30 and S31 executed by the DCM 150. In this case, the server 210 only needs to transmit a request command for information indicating the vehicle state (referred to as "vehicle-state information") to the DCM 150 in predetermined cycles. In accordance with the request command, the DCM 150 only needs to acquire the vehicle-state information from the air-conditioning ECU 110*a*, the charging ECU 110*b*, and the navigation device 140 and then to transmit the acquired vehicle-state information to the server 210. The vehicle-state information is information indicating the air-conditioning actuation time period, the set temperature, the vehicle-interior temperature, the remaining battery level, the destination, and the distance to the destination in the case of the pre-air-conditioning, and is information indicating the remaining battery level, the timer-based charging end time, the destination, the distance to the destination, the lower electricity-rate time period, and the photovoltaic power generation state in the case of the battery charging. The server 210 uses the vehicle-state information to determine whether or not the notification condition is satisfied.

Similarly, as indicated by the alternate long and short dashed line in FIG. 2, notification-condition satisfaction determination processing (S20" to S30") and notification/selection screen content setting processing (S31") may also be executed by the mobile terminal 300. The processing in Steps S20" to S30" and Step S31" is the same as that in Steps S20 to S30 and S31 executed by the DCM 150. In this case, the mobile terminal 300 only needs to transmit a request command for information indicating the vehicle state (referred to as "vehicle-state information") to the DCM 150 in predetermined cycles. The DCM 150 only needs to acquire the vehicle-state information from the air-conditioning ECU 110*a*, the charging ECU 110*b*, and the navigation device 140 and then to transmit the acquired vehicle-state information to the mobile terminal 300 in accordance with the request command. In this case, the communication between the DCM 150 and the mobile terminal 300 may be performed through an intermediation of the server 210 or may be performed directly. The vehicle-state information is the same as that in the case where the processing is executed by the server 210. The mobile terminal 300 uses the vehicle-state information to determine whether or not the notification condition is satisfied.

Moreover, in this embodiment, for example, when the air-conditioning device 180 of the vehicle is to be remotely controlled by using the mobile terminal 300, the server 210 provided to the vehicle information center 200 mediates. However, a configuration may be such that the mobile terminal 300 and the DCM 150 directly communicate with each other without an intermediation of the server 210.

Moreover, in this embodiment, the configuration is such that the DCM 150 and the server 210 communicate with each other through the communication line network 400. However, by providing the DCM 150 with a function of performing power line communication (PLC) to/from the HEMS through the charging table 190, a configuration may also be such that the DCM 150 and the server 210 communicate with each other through the HEMS.

In the remote control routine illustrated in FIG. 2, the case where the in-vehicle device (the air-conditioning device 180 or the battery charging device 130) is started by the remote control input to the mobile terminal 300 has been described. In the case where the user performs the operation in the vehicle 100 to start the in-vehicle device, however, a configuration may also be such that a subsequent notification(s) is performed by the mobile terminal 300.

Moreover, in the remote control routine for pre-air-conditioning according to this embodiment, the three OR-conditions, that is, the pre-air-conditioning duration (S22), the vehicle-interior temperature (S24), and the remaining battery level (S26) are set as the notification conditions for the user. However, at least one thereof may be used as the notification condition. For example, only the pre-air-conditioning duration, only the vehicle-interior temperature, or only the remaining battery level may be used as the notification condition. Moreover, for example, an OR-condition corresponding to the combination of the pre-air-conditioning duration and the vehicle-interior temperature may be used as the notification condition, an OR-condition corresponding to the combination of the pre-air-conditioning duration and the remaining battery level may be used as the notification condition, or an OR-condition corresponding to the combination of the vehicle-interior temperature and the remaining battery level may be used as the notification condition. Moreover, other conditions can be added.

Figure 17:
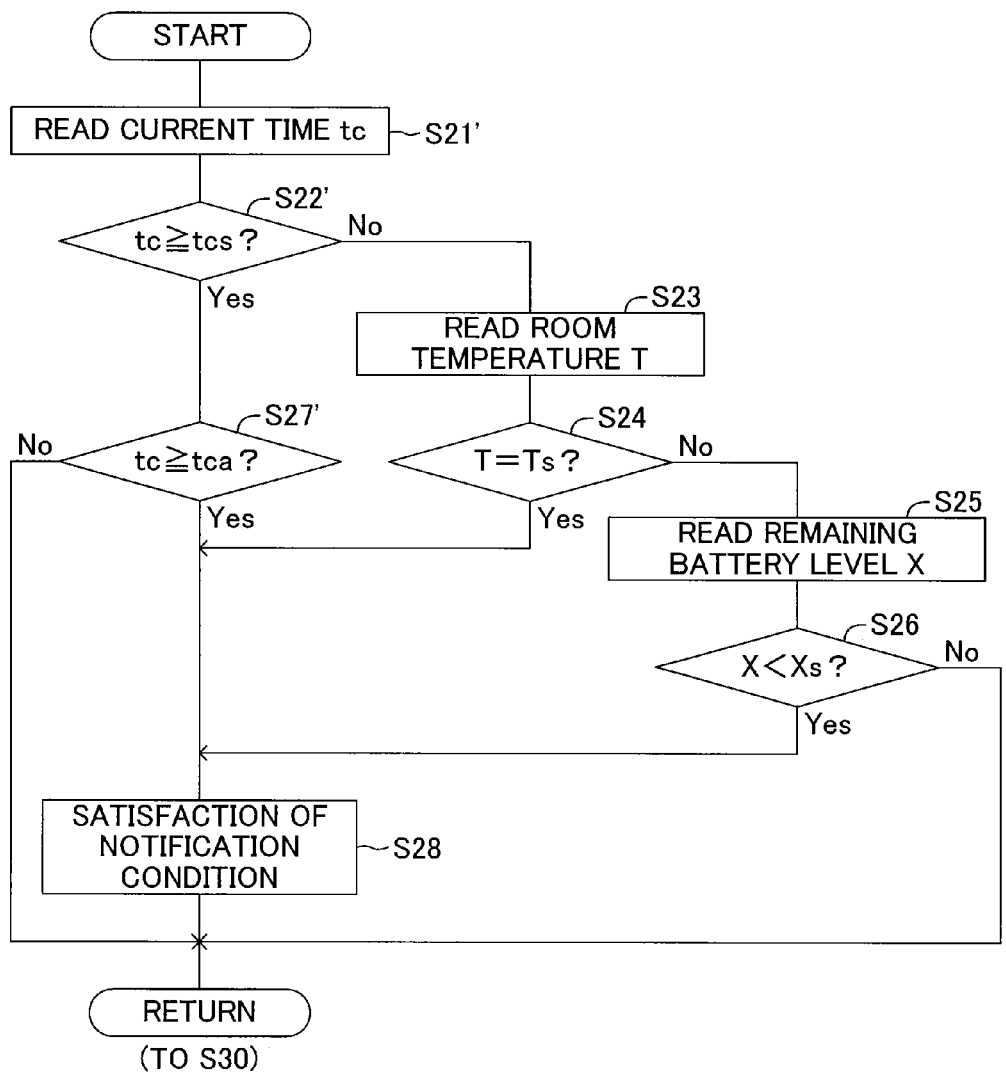
FIG. 17 is a flowchart illustrating the notification-condition satisfaction determination routine as a modified example.

Moreover, in place of the pre-air-conditioning duration (S22), which is one of the notification conditions for the pre-air-conditioning, the current time reaching the set time may be used as the notification condition. In this case, the DCM 150 only needs to execute, for example, a notification-condition satisfaction determination routine illustrated in FIG. 17 in place of the notification-condition satisfaction determination routine illustrated in FIG. 3. In the notification-condition satisfaction determination routine, Steps S21, S22', and S27' are executed in place of Steps S21, S22, and S27 of the notification-condition satisfaction determination routine illustrated in FIG. 3.

The DCM 150 reads a current time tc in Step S21' and in Step S22', determines whether or not the current time tc reaches a determination set time tcs which is predetermined time (for example, one minute) earlier than a set time tca set by the user. The set time tca is a time to terminate the pre-air-conditioning, which is set by the user in advance, and is stored in the DCM 150. When the current time tc is not the determination set time tcs yet, the processing by the DCM 150 proceeds to Step S23. Then, when the current time tc reaches the determination set time tcs, the processing by the DCM 150 proceeds to Step S27'. After waiting until the current time tc reaches the set time tca, the DCM 150 determines that the notification condition is satisfied in Step S28.

As the notification condition for the pre-air-conditioning, in addition to the notification condition based on the pre-air-conditioning duration (S22), the above-mentioned notification condition based on the current time (S22') may be set. Specifically, an OR-condition corresponding to the combination of the pre-air-conditioning duration (S22) and the current time (S22') may be used as the notification condition.

Figure 18:
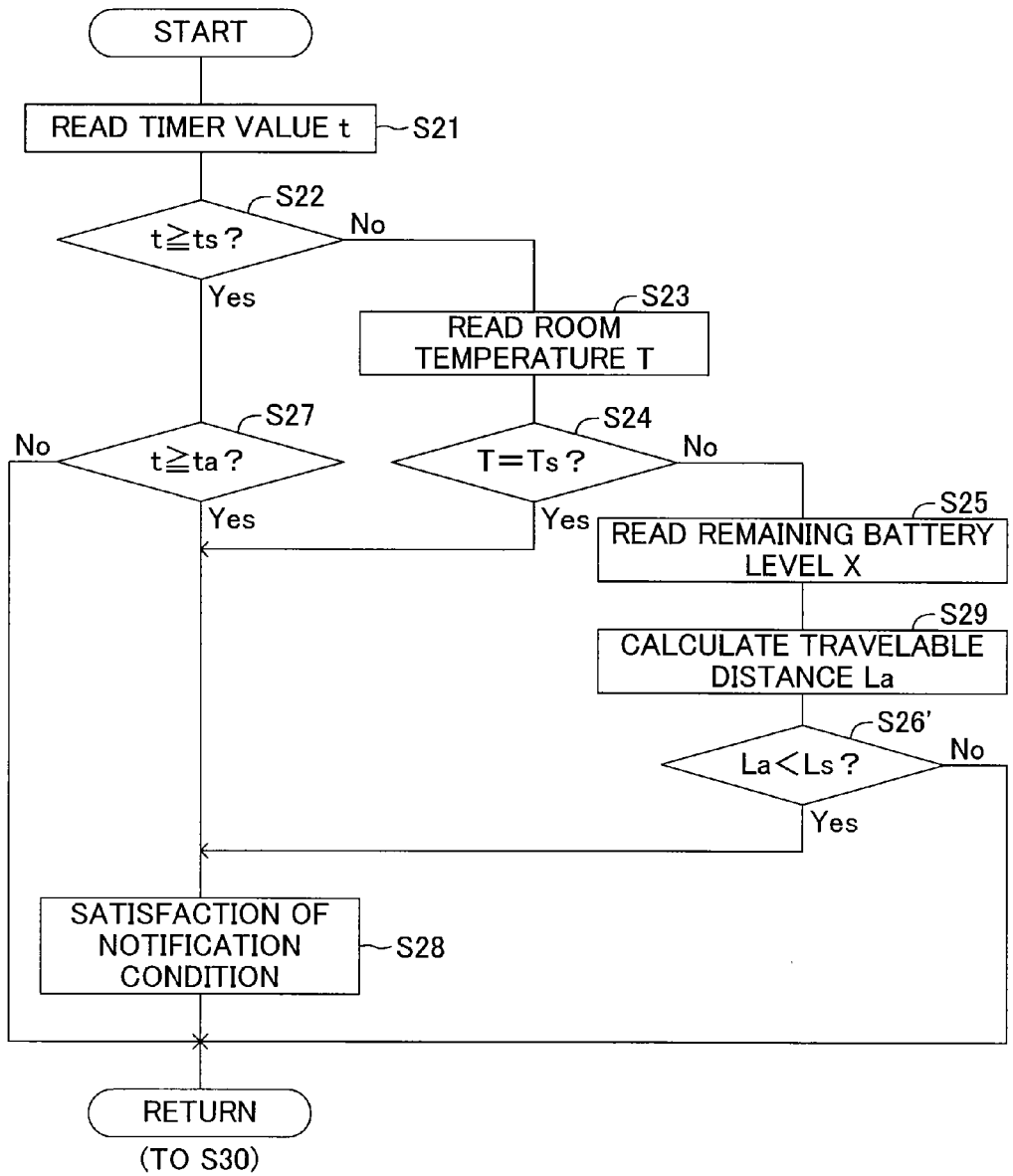
FIG. 18 is a flowchart illustrating the notification-condition satisfaction determination routine as another modified example.

As another modified example, in place of the reduction of the remaining battery level (S26), which is one of the notification conditions for pre-air-conditioning, a decrease of the travelable distance of the vehicle 100, which is calculated based on the remaining battery level X, below the set value may also be used as the notification condition. In this case, the DCM 150 only needs to perform, for example, a notification-condition satisfaction determination routine illustrated in FIG. 18 in place of the notification-condition satisfaction determination routine illustrated in FIG. 3. In the notification-condition satisfaction determination routine, Step S26' is performed in place of Step S26 of the notification-condition satisfaction determination routine illustrated in FIG. 3. Further, processing in Step S29 is additionally provided between Step S25 and Step S26'.

After reading the remaining battery level X in Step S25, in subsequent Step S29, the DCM 150 calculates a distance La over which the vehicle 100 can travel with the remaining battery level X (hereinafter referred to as "travelable distance La"). The DCM 150 stores a characteristic indicating the travelable distance of the self-vehicle for each remaining battery level in the form of map or the like. By referring to the characteristic, the travelable distance La corresponding to the remaining battery level X is calculated. Subsequently, in Step S26', the DCM 150 determines whether or not the travelable distance La is shorter than a set distance Ls. When the travelable distance La is equal to or longer than the set distance Ls, the notification condition is not satisfied. The DCM 150 repeatedly executes the notification-condition satisfaction determination routine. Then, when the travelable distance La becomes shorter than the set distance Ls in Step S26', it is determined that the notification condition is satisfied in Step S28.

Figure 19:
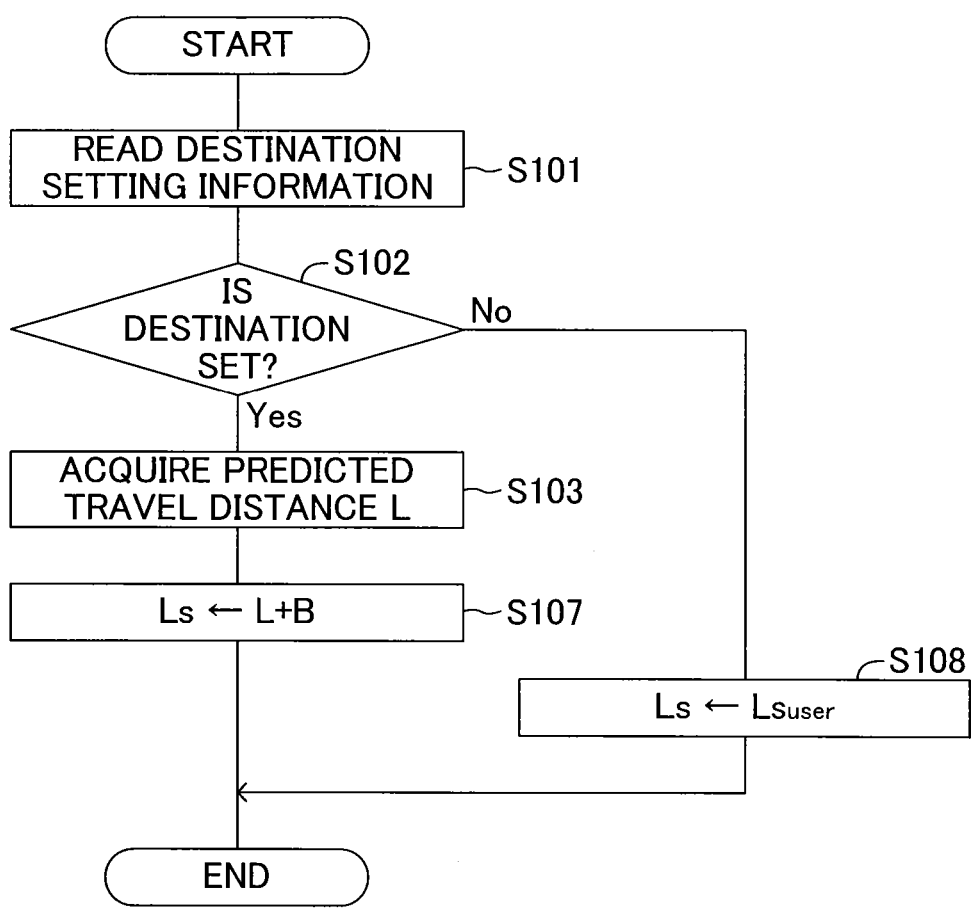
FIG. 19 is a flowchart illustrating a set distance setting routine.

In this case, the set distance Ls to be compared with the travelable distance La is set by a set distance setting routine illustrated in FIG. 19. In the set distance setting routine, Step S107 is executed in place of Steps S104 and S105 in the set remaining level setting routine illustrated in FIG. 4, and Step S108 is executed in place of Step S106. The set distance setting routine is executed immediately before the execution of the notification-condition satisfaction determination routine. When the set distance setting routine is started, in Step S103, the DCM 150 reads from the navigation device 140 the information indicating the predicted travel distance L which is the length of the traveling path from the self-vehicle position to the destination in the case where the destination for navigation is set (S102: Yes). Subsequently, in Step S107, a value obtained by adding an extra distance B to the predicted travel distance L is calculated. Then, the result of calculation is set as the set distance Ls (Ls=L+B). The extra distance B is a distance which is set to leave a certain travelable distance even after the vehicle arrives at the destination, and can be set arbitrarily.

On the other hand, in the case where it is determined that the destination for navigation is not set (S102: No), in Step S108, the DCM 150 sets a set distance $Ls_{user}$ which is preset by the user as the set distance Ls. The set distance $Ls_{user}$ is set by, for example, the operation of the mobile terminal 300 by the user, and is transmitted to the DCM 150 so as to be stored therein. For example, for the user who uses the vehicle every day for commuting or the like, the remaining battery level necessary for everyday travel is required to be ensured. In such a case, even without setting the destination, a necessary travel distance (for example, 40 km) in accordance with a scheduled daily travel distance (for example, 30 km) which is obtained in advance is set as the set distance $Ls_{user}$. The set distance Ls set in Step S108 is not required to be set to the set value $Ls_{user}$ set by the user, but may be a preset fixed value.

After setting the set distance Ls in Step S107 or Step S108, the DCM 150 terminates the set distance setting routine. The set distance Ls is used as a determination criterion in Step S26' of the notification-condition satisfaction determination routine. Therefore, in the case where the destination for navigation is set and "Yes" is determined in Step S26', it is estimated that the vehicle cannot travel to the destination with the remaining battery level X at that time under the current condition.

In the remote control routine for the battery charging according to this embodiment, the three OR-conditions, that is, the lower electricity-rate end time (S221), the remaining battery level at the timer-based charging end time (S222, S224), and the photovoltaic power generation state (S223) are set as the notification conditions for the user. However, only one of the three OR-conditions may be used as the notification condition. For example, only the lower electricity-rate end time, only the remaining battery level at the timer-based charging end time, or only the photovoltaic power generation state may be used as the notification condition. Moreover, for example, an OR-condition corresponding to the combination of the lower electricity-rate end time and the timer-based charging end time may be used as the notification condition. Alternatively, an OR-condition corresponding to the combination of the lower electricity-rate end time and the photovoltaic power generation state may be used as the notification condition. Further alternatively, an OR-condition corresponding to the combination of the remaining battery level at the timer-based charging end time and the photovoltaic power generation state may be used as the notification condition. Further, other notification conditions can be added.

Moreover, the mobile terminal 300 is used as a remote control terminal used by the user in this embodiment. However, a terminal provided at a position away from the vehicle 100 such as a personal computer without portability, which is installed in a household, can also be used.

In this embodiment, the navigation device 140 is mounted in the vehicle 100. However, the server 210 may be provided with a navigation function instead. In this case, the server 210 may be configured to execute the set remaining level setting routine (FIG. 4).

Moreover, in this embodiment, the system is applied to the plug-in vehicle including the battery which is chargeable by the external power supply. However, the remote control system for the pre-air-conditioning can also be applied to other vehicles, for example, a non-plug-in hybrid vehicle or a vehicle without a drive motor, which runs with an internal combustion engine alone. In this case, for example, a notification of information regarding a fuel amount may be made in place of the notification of the information regarding the remaining battery level. Specifically, a notification of information regarding a remaining amount of energy of an energy supply source for supplying energy required for a travel of the vehicle and energy required for pre-air-conditioning only needs to be made.

For the communication between the vehicle 100 and the mobile terminal 300, near-field wireless communication between the near-field communication control device 160 and the near-field communication control section 302 may be adopted without using the communication line network 400.

The invention claimed is:

1. A vehicle remote control system for transmitting a remote control command input by a user to a remote control terminal to an in-vehicle terminal so as to control actuation of an air-conditioning device for air-conditioning a vehicle interior based on the remote control command, the vehicle remote control system comprising:
   vehicle-state detection means for detecting a vehicle state;
   notification means for notifying the user of information regarding a vehicle-interior temperature and a remaining energy amount of an energy supply source for actuation of the air-conditioning device as information regarding the vehicle state when a preset set condition including at least one of a condition that the vehicle-interior temperature reaches a set temperature, a condition that an actuation duration of the air-conditioning device becomes equal to a set time period, and a condition that a current time reaches a set time is satisfied after start of the actuation of the air-conditioning device;
   selection-screen display means for displaying a selection screen for allowing the user to select whether to continue or terminate the actuation of the air-conditioning device on the remote control terminal when the notification is made by the notification means; and
   actuation control means for controlling the actuation of the air-conditioning device in accordance with a result of selection made by the user.

2. A vehicle remote control system according to claim 1, wherein:
   the preset set condition includes a condition that the remaining energy amount or a travelable distance of a vehicle, which is calculated based on the remaining energy amount, becomes smaller than a set value as the preset set condition.

3. A server to be applied to the vehicle remote control system according to claim 1, for mediating communication between the remote control terminal and the in-vehicle terminal, the server comprising:
   condition satisfaction determination means for receiving the information regarding the vehicle state transmitted from the in-vehicle terminal after start of the actuation of the air-conditioning device to determine based on the information whether or not the preset set condition is satisfied;
   transmission means for transmitting mobile terminal notification information regarding the vehicle state for a notification to the user and a command for displaying the selection screen for allowing the user to select whether to continue or terminate the actuation of the air-conditioning device when satisfaction of the preset set condition is determined by the condition satisfaction determination means; and
   selection result transfer means for receiving a result of selection transmitted from the remote control terminal and transmitting the received result of selection to the in-vehicle terminal.

4. A remote control terminal to be applied to the vehicle remote control system according to claim 1, the remote control terminal comprising:
condition satisfaction determination means for receiving the information regarding the vehicle state transmitted from the in-vehicle terminal after start of the actuation of the air-conditioning device to determine based on the information whether or not the preset set condition is satisfied;
notification/selection screen display means for displaying the selection screen for notifying the user of the information regarding the vehicle state and allowing the user to select whether to continue or terminate the actuation of the air-conditioning device when satisfaction of the preset set condition is determined by the condition satisfaction determination means; and
selection result transmission means for transmitting a result of selection made by the user to the in-vehicle terminal.

5. A vehicle remote control system for transmitting a remote control command input by a user to a remote control terminal to an in-vehicle terminal so as to control actuation of an air-conditioning device for air-conditioning a vehicle interior based on the remote control command, the vehicle remote control system comprising:
circuitry configured to:
detect a vehicle state;
notify the user of information regarding a vehicle-interior temperature and a remaining energy amount of an energy supply source for actuation of the air-conditioning device as information regarding the vehicle state when a preset set condition including at least one of a condition that the vehicle-interior temperature reaches a set temperature, a condition that an actuation duration of the air-conditioning device becomes equal to a set time period, and a condition that a current time reaches a set time is satisfied after start of the actuation of the air-conditioning device;
display a selection screen for allowing the user to select whether to continue or terminate the actuation of the air-conditioning device on the remote control terminal when the notification is made; and
control the actuation of the air-conditioning device in accordance with a result of selection made by the user.

6. A vehicle remote control system according to claim 5, wherein:
the preset set condition includes a condition that the remaining energy amount or a travelable distance of a vehicle, which is calculated based on the remaining energy amount, becomes smaller than a set value as the preset set condition.

7. A server to be applied to the vehicle remote control system according to claim 5, for mediating communication between the remote control terminal and the in-vehicle terminal, the server comprising:
circuitry configured to:
receive the information regarding the vehicle state transmitted from the in-vehicle terminal after start of the actuation of the air-conditioning device to determine based on the information whether or not the preset set condition is satisfied;
transmit remote control terminal notification information regarding the vehicle state for a notification to the user and a command for displaying the selection screen for allowing the user to select whether to continue or terminate the actuation of the air-conditioning device when satisfaction of the preset set condition is determined; and
receive a result of selection transmitted from the remote control terminal and transmitting the received result of selection to the in-vehicle terminal.

8. A remote control terminal to be applied to the vehicle remote control system according to claim 5, the remote control terminal comprising:
circuitry configured to:
receive the information regarding the vehicle state transmitted from the in-vehicle terminal after start of the actuation of the air-conditioning device to determine based on the information whether or not the preset set condition is satisfied;
display the selection screen for notifying the user of the information regarding the vehicle state and allowing the user to select whether to continue or terminate the actuation of the air-conditioning device when satisfaction of the preset set condition is determined; and
transmit a result of selection made by the user to the in-vehicle terminal.

* * * * *